(12) United States Patent
Smith et al.

(10) Patent No.: US 12,247,884 B2
(45) Date of Patent: Mar. 11, 2025

(54) CUSTOMIZABLE SUPPLIES FOR HIGH TEMPERATURE EXPOSURE MONITORING

(71) Applicant: Temptime Corporation, Morris Plains, NJ (US)

(72) Inventors: Marielle K. Smith, Parlin, NJ (US); Mohannad Abdo, Clifton, NJ (US); Eric W. Liberato, Pequannock, NJ (US); John E. Olson, Dayton, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 664 days.

(21) Appl. No.: 17/508,206

(22) Filed: Oct. 22, 2021

(65) Prior Publication Data

US 2023/0126486 A1    Apr. 27, 2023

(51) Int. Cl.
G01K 11/12 (2021.01)
G01K 1/02 (2021.01)
G01K 3/04 (2006.01)

(52) U.S. Cl.
CPC .......... G01K 11/12 (2013.01); G01K 1/02 (2013.01); G01K 3/04 (2013.01)

(58) Field of Classification Search
CPC .......... G01K 11/12; G01K 1/02; G01K 3/04
See application file for complete search history.

(56) References Cited

U.S. PATENT DOCUMENTS 4,929,091 A * 5/1990 Kostic .................. G01K 11/16 374/162
6,592,255 B1 * 7/2003 Duroux ................. B60R 1/12 374/162

(Continued)

FOREIGN PATENT DOCUMENTS

DE  102014017535  6/2016
JP  2005220089    8/2005

(Continued)

OTHER PUBLICATIONS

International Search Report dated Jan. 24, 2023 issued for International PCT Application No. PCT/US2022/046016.

(Continued)

Primary Examiner — Nathaniel T Woodward
Assistant Examiner — Philip L Cotey
(74) Attorney, Agent, or Firm — K&L Gates LLP

(57) ABSTRACT

An excess heat exposure indicator and methods for making the same are disclosed. The excess heat exposure indicator includes a print media substrate comprising an indicator region, a data region, at least one first thermochromic composition is provided on the substrate within the indicator region of the substrate, a second thermochromic composition is provided on the substrate within the data region, the second thermochromic composition configured to change color state from a third color state to a fourth color state when heated above a second temperature threshold, the indicator region is configured to be selectively treated with heat above the first temperature threshold to place a first portion of the indicator region in the second color state, different than the first color state, forming a visible indicia, the visible indicia configured to change appearance when the indicator region is subsequently exposed to a temperature above the first temperature threshold.

31 Claims, 15 Drawing Sheets

(56) References Cited

U.S. PATENT DOCUMENTS

| | | | | |
|---|---|---|---|---|
| 7,712,431 B2* | 5/2010 | Roche | ............... | G01K 1/14 |
| | | | | 374/106 |
| 10,323,989 B2* | 6/2019 | Ribi | ............... | B65D 1/36 |
| 2002/0157464 A1* | 10/2002 | Rait | ............... | G01F 23/22 |
| | | | | 73/293 |
| 2007/0171506 A1* | 7/2007 | Jordan | ............... | G01K 11/12 |
| | | | | 359/288 |
| 2007/0207280 A1* | 9/2007 | Wolfe | ............... | G09F 9/30 |
| | | | | 428/34.1 |
| 2010/0012018 A1* | 1/2010 | Ribi | ............... | G01K 3/04 |
| | | | | 252/182.13 |
| 2013/0068155 A1* | 3/2013 | Patel | ............... | G01K 11/12 |
| | | | | 116/216 |
| 2014/0044609 A1* | 2/2014 | Prusik | ............... | G01N 31/229 |
| | | | | 422/429 |
| 2014/0154808 A1* | 6/2014 | Patel | ............... | A61L 2/28 |
| | | | | 436/1 |
| 2015/0219505 A1* | 8/2015 | Parker | ............... | B05D 5/06 |
| | | | | 442/76 |
| 2015/0308901 A1* | 10/2015 | Salman | ............... | G01K 3/04 |
| | | | | 374/102 |
| 2016/0076947 A1* | 3/2016 | Ribi | ............... | C09B 67/0013 |
| | | | | 250/474.1 |
| 2016/0153843 A1* | 6/2016 | Edson | ............... | G01K 11/12 |
| | | | | 116/216 |
| 2016/0273972 A1* | 9/2016 | Schmidt | ............... | G01K 11/12 |
| 2016/0349225 A1* | 12/2016 | Prusik | ............... | G01K 11/12 |
| 2017/0363479 A1* | 12/2017 | Harvey | ............... | G01K 11/12 |
| 2019/0346415 A1* | 11/2019 | Abdo | ............... | G01K 3/04 |
| 2019/0383649 A1* | 12/2019 | Abdo | ............... | B41M 5/40 |
| 2020/0003631 A1* | 1/2020 | Sambongi | ............... | G01K 3/005 |
| 2020/0041359 A1* | 2/2020 | Aida | ............... | C09B 9/00 |
| 2020/0048542 A1* | 2/2020 | Umemoto | ............... | C09D 11/037 |
| 2020/0309607 A1* | 10/2020 | Small | ............... | C09K 9/02 |
| 2021/0034933 A1* | 2/2021 | Abdo | ............... | G06K 7/14 |
| 2021/0215551 A1* | 7/2021 | Fonk | ............... | G01K 7/38 |

FOREIGN PATENT DOCUMENTS

| | | |
|---|---|---|
| WO | WO 9628714 | 9/1996 |
| WO | WO 2014153446 | 9/2014 |
| WO | WO 2015128655 | 9/2015 |
| WO | WO 2020097154 | 5/2020 |

OTHER PUBLICATIONS

International Search Report and Written Opinion mailed Jan. 16, 2020 issued for International PCT Application No. PCT/US19/59988.

* cited by examiner

CUSTOMIZABLE SUPPLIES FOR HIGH TEMPERATURE EXPOSURE MONITORING

BACKGROUND

Many types of products are perishable under different environmental conditions. For example products may be degraded or rendered unsafe or otherwise unusable by a peak heat exposure over a threshold that rapidly causes product deterioration, such as denaturing the proteins of a biologic product or thawing of a frozen product. Thermochromic indicators are used to show historical exposure to a high temperature, often in a visible manner by change of color of an indicator material in response to temperature exposure above a threshold. These may sometimes be termed ascending temperature excursion exposure indicators, in reference to an excursion of the temperature above the threshold temperature, peak heat or temperature exposure indicators, or similar terms, as distinguished from cumulative or time-temperature heat or temperature exposure indicators that measure cumulative exposure to heat or excess temperature over a period of time, which may be days, weeks, or even years. The types of thermochromic materials considered in the present disclosure maintain their changed color even after the temperature returns below the threshold, which may be termed an "historical", "irreversible" or "permanent" exposure indication.

As historical environmental exposure indicators and other types of temperature indicators gain broader use, it is desirable to allow them to be added to product labels or packaging (or customized if already present) at the time the labels and packaging are manufactured, or even at the point where a host product or its container is labeled.

A common approach to producing custom labels for packages is the use of direct thermal printers, for example, the Zebra ZT600, the Zebra ZT400, the Zebra ZD600, the Zebra ZD400 series printers, available from Zebra Technologies Corp or any other thermal printer may be used. These thermal printers use thermal media that also includes thermochromic materials that are configured to change color as part of the printing process, in reaction to the heat and/or pressure from a thermal print head. The present disclosure describes high temperature exposure sensors that may be customized with such printers, as well as related method of manufacture and customization.

The present disclosure describes indicators and environmental indicators where thermochromic peak temperature exposure indicators are paired with thermal print media to produce peak temperature exposure indicators that may be customized with a thermal printer, e.g., at the time a label or package is printed using a direct thermal printer.

SUMMARY

Disclosed herein are excess heat exposure indicators and methods for making and/or customizing the same are disclosed. The excess heat exposure indicator includes a direct thermal print media substrate comprising an indicator region, a data region, at least one first thermochromic composition provided on the substrate within the indicator region of the substrate, a second thermochromic composition is provided on the substrate within the data region, the second thermochromic composition configured to change color state from a third color state to a fourth color state when heated above a second temperature threshold, the indicator region is configured to be selectively treated with heat above the first temperature threshold to place a first portion of the indicator region in the second color state, different than the first color state, forming a visible indicia, the visible indicia configured to change appearance when the indicator region is subsequently exposed to a temperature above the first temperature threshold.

Aspects of the subject matter described herein may be useful alone or in combination with one or more other aspects described herein. In an aspect of the present disclosure, a temperature exposure indicator includes a substrate a print media substrate comprising an indicator region, a data region and at least one first thermochromic composition is provided on the substrate within the indicator region of the substrate, the first thermochromic composition configured to change color state from a first color state to a second color state when exposed to a temperature above a first temperature threshold.

In another aspect of the present disclosure, which may be used in combination with any other aspect or combination of aspects listed herein, a second thermochromic composition is provided on the substrate within the data region, the second thermochromic composition configured to change color state from a third color state to a fourth color state when heated above a second temperature threshold, wherein the second temperature threshold is higher than the first temperature threshold.

In another aspect of the present disclosure, which may be used in combination with any other aspect or combination of aspects listed herein, the indicator region is configured to be selectively treated with heat above the first temperature threshold to place a first portion of the indicator region in the second color state, different than the first color state, forming a visible indicia, the visible indicia configured to change appearance when the indicator region is subsequently exposed to a temperature above the first temperature threshold.

In another aspect of the present disclosure, which may be used in combination with any other aspect or combination of aspects listed herein, the indicia subsequently changes appearance when the remaining portion within the indicator region adjacent to the first portion changes to the second color state above the first threshold.

In another aspect of the present disclosure, which may be used in combination with any other aspect or combination of aspects listed herein, the first color state and the second color state are visibly contrasting and the third color state and the fourth color state are visibly contrasting.

In another aspect of the present disclosure, which may be used in combination with any other aspect or combination of aspects listed herein, the indicia is configured to become unreadable or disappear when the indicator is exposed to a temperature above the predetermined threshold.

In another aspect of the present disclosure, which may be used in combination with any other aspect or combination of aspects listed herein, the substrate is a direct thermal print media, configured to be printed by a thermal printer at or above a print temperature, the print temperature being above the predetermined temperature threshold.

In another aspect of the present disclosure, which may be used in combination with any other aspect or combination of aspects listed herein, when exposed to an ambient temperature between the predetermined temperature threshold and the print temperature, the second portion of the indicator region is placed in the final color state thereby changing the appearance of the indicia.

In another aspect of the present disclosure, which may be used in combination with any other aspect or combination of aspects listed herein, the data region and the indicator region are in separate regions on the substrate.

In another aspect of the present disclosure, which may be used in combination with any other aspect or combination of aspects listed herein, a dataform is printed on the data region of the substrate with the direct thermal printer.

In another aspect of the present disclosure, which may be used in combination with any other aspect or combination of aspects listed herein, the initial color state of the irreversible thermochromic composition is colorless.

In another aspect of the present disclosure, which may be used in combination with any other aspect or combination of aspects listed herein, the final color state of the irreversible thermochromic composition is a color viewable to the human eye.

In another aspect of the present disclosure, which may be used in combination with any other aspect or combination of aspects listed herein, a plurality of indicator regions are provided on the print media substrate, each of the plurality of indicator regions transitioning from a respective initial color state to a respective final color state at a respective predetermined threshold temperature.

In another aspect of the present disclosure, which may be used in combination with any other aspect or combination of aspects listed herein, the predetermined temperature threshold is in a range from about 0° C. to about 60° C., from about 5° C. to about 10° C., from about 5° C. to about 15° C., from about 35° C. to about 45° C., from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C.

In another aspect of the present disclosure, which may be used in combination with any other aspect or combination of aspects listed herein, the irreversible thermochromic composition is configured to remain in the initial color state while exposed to an ambient temperatures below the predetermined temperature threshold.

In another aspect of the present disclosure, which may be used in combination with any other aspect or combination of aspects listed herein, the at least one irreversible thermochromic composition comprises at least one of (i) leuco dye (ii) liquid crystal; (iii) wax; (iv) micro-encapsulated dye; (v) an ester; (vi) an alkane; (vii) an organic polymer; (viii) an inorganic material; (ix) side chain crystalline polymer.

In another aspect of the present disclosure, which may be used in combination with any other aspect or combination of aspects listed herein, the substrate further comprises at least one of (i) paper; (ii) polyester; (iii) nylon; (iv) vinyl; (v) other synthetic polymers.

In another aspect of the present disclosure, which may be used in combination with any other aspect or combination of aspects listed herein, the indicator region includes an indicia that indicates the indicator has not been exposed to an ambient temperature sufficient for sterilization, and wherein the predetermined temperature threshold is at least 120° C., wherein the indicia is configured to be altered when the indicator is exposed to an ambient temperature above the predetermined temperature threshold.

In another aspect of the present disclosure, which may be used in combination with any other aspect or combination of aspects listed herein, the first portion of the indicator region, upon transitioning from the initial color state to the final color state, is configured to provide a partial pattern, wherein upon the second portion of the indicator region transitioning from the initial color state to the final color state, the pattern provided by the first indicator region is completed, providing visual indication of exposure to an ambient temperatures greater than a predetermined temperature threshold.

In another aspect of the present disclosure, which may be used in combination with any other aspect or combination of aspects listed herein, the second portion of the indicator region, upon transitioning from the initial color state to the final color state, is configured to provide a bar code or a portion of a bar code that is readable by an optical scanning device to produce a value, wherein upon the second portion of the indicator region transitioning from the initial color state to the final color, the appearance of the bar code is affected, and wherein the changed appearance of the bar code provides a different signal to the optical scanning device.

In another aspect of the present disclosure, which may be used in combination with any other aspect or combination of aspects listed herein, the indicator region does not occupy the entire face of the substrate.

In another aspect of the present disclosure, which may be used in combination with any other aspect or combination of aspects listed herein, a method of creating an excess temperature exposure indicator includes receiving a print media substrate having an indicator region of the substrate where at least one irreversible thermochromic composition is provided on the substrate the thermochromic composition configured to have an initial color state prior to being exposed to a temperature below a predetermined temperature threshold and a final color state when exposed to a temperature above a predetermined temperature threshold, wherein the substrate is provided with the thermochromic composition in the initial color state.

In another aspect of the present disclosure, which may be used in combination with any other aspect or combination of aspects listed herein, selectively exposing a portion of the indicator region to a temperature above the predetermined temperature threshold to produce a human readable indicia that is configured to change appearance when the indicator region is subsequently exposed to an ambient temperature above the predetermined temperature threshold.

In another aspect of the present disclosure, which may be used in combination with any other aspect or combination of aspects listed herein, the print media includes a thermal print media substrate, wherein the method further comprising exposing a portion of the thermal print media substrate using a thermal printer to a print temperature above a print temperature threshold which is greater than the predetermined threshold temperature.

In another aspect of the present disclosure, which may be used in combination with any other aspect or combination of aspects listed herein, the thermochromic composition is visible to the human eye in the initial color state and becomes invisible when exposed to the temperature above the predetermined temperature threshold.

In another aspect of the present disclosure, which may be used in combination with any other aspect or combination of aspects listed herein, the initial color state of the irreversible thermochromic composition is colorless.

In another aspect of the present disclosure, which may be used in combination with any other aspect or combination of aspects listed herein, the final color state of the irreversible thermochromic composition is a color viewable to the human eye.

In another aspect of the present disclosure, which may be used in combination with any other aspect or combination of aspects listed herein, the color viewable to the human eye when the irreversible thermochromic composition is in the final color state is selected from a plurality of colors based upon the irreversible thermochromic composition.

In another aspect of the present disclosure, which may be used in combination with any other aspect or combination of aspects listed herein, the irreversible thermochromic composition within the first portion of the indicator region enters the final color state before the irreversible thermochromic composition within the indicator region enters the final color state.

In another aspect of the present disclosure, which may be used in combination with any other aspect or combination of aspects listed herein, the predetermined temperature threshold is in a range from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C.

In another aspect of the present disclosure, which may be used in combination with any other aspect or combination of aspects listed herein, the at least one irreversible thermochromic composition is configured to change from an initial color state to a final color state in response to exposure to an ambient temperature above a predetermined temperature threshold.

In another aspect of the present disclosure, which may be used in combination with any other aspect or combination of aspects listed herein, the at least one irreversible thermochromic composition is configured to remain in the initial color state when exposed to an ambient temperatures below a predetermined temperature threshold.

In another aspect of the present disclosure, which may be used in combination with any other aspect or combination of aspects listed herein, the at least one irreversible thermochromic composition comprises at least one of (i) leuco dye (ii) liquid crystal; (iii) wax; (iv) micro-encapsulated dye; (v) an ester; (vi) an alkane; (vii) an organic polymer; (viii) an inorganic material.

In another aspect of the present disclosure, which may be used in combination with any other aspect or combination of aspects listed herein, the substrate further comprises at least one of (i) paper; (ii) polyester; (iii) nylon; (iv) vinyl; (v) other synthetic polymers.

In another aspect of the present disclosure, which may be used in combination with any other aspect or combination of aspects listed herein, the substrate includes an adhesive backing.

These and other features are disclosed in greater detail in the accompanying figures and the Detailed Description below.

BRIEF DESCRIPTION OF THE FIGURES

Some example apparatus embodiments of the invention, and example procedures for making and using one or more example embodiments, are described in detail herein and by way of example, with reference to the accompanying drawings (which are not necessarily drawn to scale with regard to any internal or external structures shown) and in which like reference characters designate like elements throughout the several views, and in which.

DETAILED DESCRIPTION OF EXAMPLE EMBODIMENTS

Figure 1A:
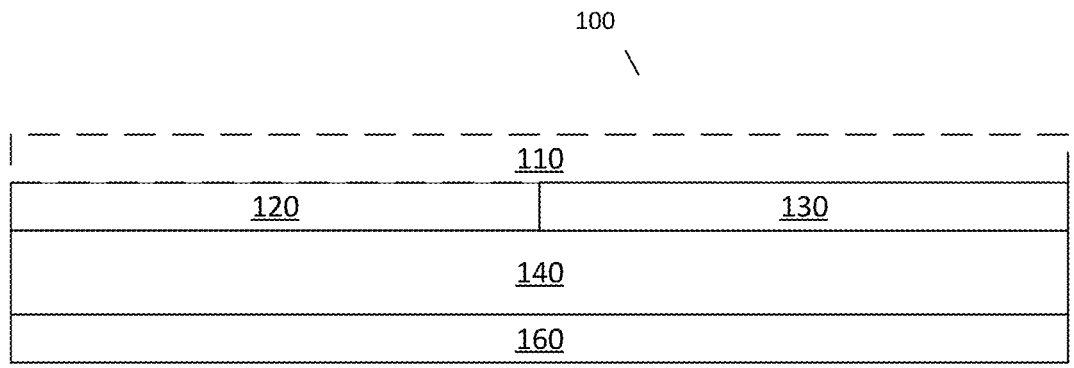
FIG. 1A illustrates a perspective view of the layers of a temperature exposure indicator prior to customization, according to an example of the present disclosure.

The present disclosure generally describes the use of irreversible color changing materials to produce several types of customizable labels with excess temperature exposure indication, some of which are suitable for use with direct thermal printers. Direct thermal printers may be used to customize the color state and appearance of the label. Some of these indicators may be particularly suited for the manufacture or customization of the indicators on customized labels which are printed and/or customized when a host product is manufactured or when it is packaged for distribution, or even at a later point in its life cycle or distribution chain.

Additionally, techniques for printing customizable environmental exposure indicators, such as temperature exposure indicators, with a thermal printer stock are disclosed.

A need exists for a customizable medium with an ascending temperature excursion indicator that is easily customized by product manufacturers or distributors, e.g., labeling product at the point of manufacture or shipment, as well as an indicator that is easy to interpret by a product end-user who receives a product having a label produced using the customizable medium. Some of the examples in the present disclosure provide efficient on-demand label customization, that may occur at the same time labels are printed and/or time stamped or recorded. The discloses approach may be employed with various types of environmental exposure indicators that can be stored in a wide range of environmental conditions and detect a wide range of environmental conditions.

As used herein, the term "predetermined temperature threshold" means a temperature where exposure to a temperature beyond, (for example, at above for an ascending excursion indicator) the threshold causes an indicator to change color state. It will be appreciated that this change of state, may not be completely instantaneous, but is short enough that rapid exposures to temperature that would effect a host product also cause a change in color state of the indicator.

As used herein, the term "print media substrate" means a printable medium that is relatively flat, and suitable for direct thermal printing, such as paper, cardboard, cardstock or plastic. In an embodiment, the substrate may be one of (i) paper; (ii) polyester; (iii) nylon; (iv) vinyl; (v) other synthetic polymers. In an additional embodiment, the substrate may be porous materials such as papers & films (e.g., carbon fiber, Teslin synthetic paper, polyethylene ("PE"), polypropylene ("PP"), polytetrafluoroethylene ("PTFE"), polyester, polyethylene, polyolefin, polyimide, vinyl, acrylic film, polypropylene, non-woven nylon, coated and non-coated direct thermal paper, printable polyethylene terephthalate ("PET"), oriented polypropylene ("OPP"), biaxially oriented polypropylene ("BOPP").

As used herein, the term "thermal print head" refers to a component of a thermal printer device that selectively transfers heat and, optionally, applies pressure to a thermal print medium in response to an instruction from a controller, operatively connected to a thermal printer.

As used herein, the term "thermochromic composition" refers to a composition or combination of compositions that possess the property of changing color state in response to a change in temperature.

As used herein, the term "color state" refers to an observable color including a change in hue, darkness, color intensity, opacity, fluorescence or phosphorescence, or other observable optical properties of the indicator material. The change in color state may be detectable by the unaided human eye, or may occur in a manner that requires machine detection, e.g., at wavelengths not visible to the unaided human eye.

Ascending Indicators

In the present disclosure, exemplified ascending temperatures include threshold temperature indicators that can be used to determine if a perishable product has been maintained at an acceptable temperature range or has been exposed to temperature excursion above a high temperature threshold.

To signal past exposure to a temperature above a predetermined threshold, indicators according to the present disclosure usefully can have one observable appearance, for example a first color state, before exposure to a temperature at or above a threshold. After exposure of the indicator to a temperature at or above a threshold, a different observable appearance, for example a second color state that is distinguishable from the first color state is observable by human or machine inspection. This observable change can be provided by the disappearance of an underlying thermochromic composition or indicia that was observable before the indicator was exposed to temperatures at or above the threshold temperature. Additionally, the appearance of a warning or other indication that the temperature exposure has occurred, or a change in color or in the appearance of an indicia can be provided.

Indicator Materials

In the present disclosure, indicators for excess temperature exposure may be provided using irreversible thermochromic compositions.

In the present disclosure, the thermochromic composition may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the thermochromic composition may be one of leuco dye, a micro-encapsulated leuco-dye, microencapsulated leuco pigments (basic components of thermochromic microcapsules include dye, developer, and solvent), an side chain crystalline (SCC) Polymer, a water-based SCC polymer emulsion, liquid crystal, inorganic materials, a diacetylene, an alkane, a wax, an ester or combinations thereof.

Because many indicator materials are tunable, e.g., selectable to have particular properties, it may be particularly helpful to tune the material so that very short exposures to conventional thermal print temperature do not change the color state, but slightly longer exposures do. This may be allow the material to be paired with a conventional thermal print media in the same region, and allow the thermal printer to print without changing the state of the material.

Printing and Customization

A conventional printing technology for printing dataforms or images, such as barcode symbols, is direct thermal printing. A direct thermal printer does not use a ribbon, but instead the printable media itself is the thermal media. The direct thermal media, includes a web of material, e.g., paper, polymers, or the like, which is impregnated or coated with a thermochromic material that changes color when exposed to sufficient heat. A common thermochromic material for such applications is a leuco dye. The media may be impregnated with a solid-state mixture of a dye and a suitable matrix, for example, a fluoran leuco dye and an octadecylphosphonic acid. When the matrix is heated above its melting point, the dye reacts with the acid, shifts to its colored form, and the changed form is then conserved in metastable state when the matrix solidifies back quickly enough. This process is usually monochrome, but some two-color designs exist, which can print both black and an additional color (often red) by applying heat at two different temperatures. In an example, where multi-color designs are desired, multi-head printers that operate simultaneously may be utilized. In this example, print temperatures for each of the colors are above the expected ambient temperatures that the indicator will be exposed to in the normal lifetime of the indicator. Additionally, multi-color applications may be achieved by either using media with multiple chemistries that change different colors once exposed to a particular amount of energy and/or heat or applying different amounts of energy and/or heat to a particular media/chemistry through multiple printheads that change colors based on that amount of energy and/or heat. For conventional thermal printing application, these temperatures are generally selected to be temperatures well above typical ambient environmental exposure temperatures, otherwise the printed media would be altered or spoiled in ordinary handling.

In the printing process, selected portions of the media switches from a first chemical form that is colorless to a second chemical form that is black or colored. The web of direct thermal media is pressed against and moved past the thermal print head. The thermal print head receives data of a rendered bitmap and heats specific heating elements within the row of addressable heaters according to the data provided.

To print labels or other documents, thermal printers may use a thermal print head comprising a row of addressable heating elements to heat a thermal media. The elements are small compared to the image to be printed; e.g., 8, 12, or 24 elements per mm are typical, and other resolutions, are commercially available. This differs from thermal inkjet printers which use addressable heaters to heat an ink or wax that is dropped or ejected to a document or other printable media.

Heat from the heated elements causes the heat sensitive media on the printing region of the substrate to transition from colorless to colored, e.g., from a white substrate background to black print. Additionally, the heat from the heated elements may cause the thermochromic indicator compositions on the indicator regions of the substrate to transition from low temperature color state to a high temperature color state. Additionally, if different inks are applied having different response temperatures, this may allow for selective imaging of specific print regions. Print head heating elements which are not heated generally do not cause a color transition. In some direct thermal media, a first zone of the media includes an environmental thermochromic material that transitions from a first color to colorless while a second zone of the printable media includes a printing thermochromic material that transitions from colorless to a second, different color.

Figure 1B:
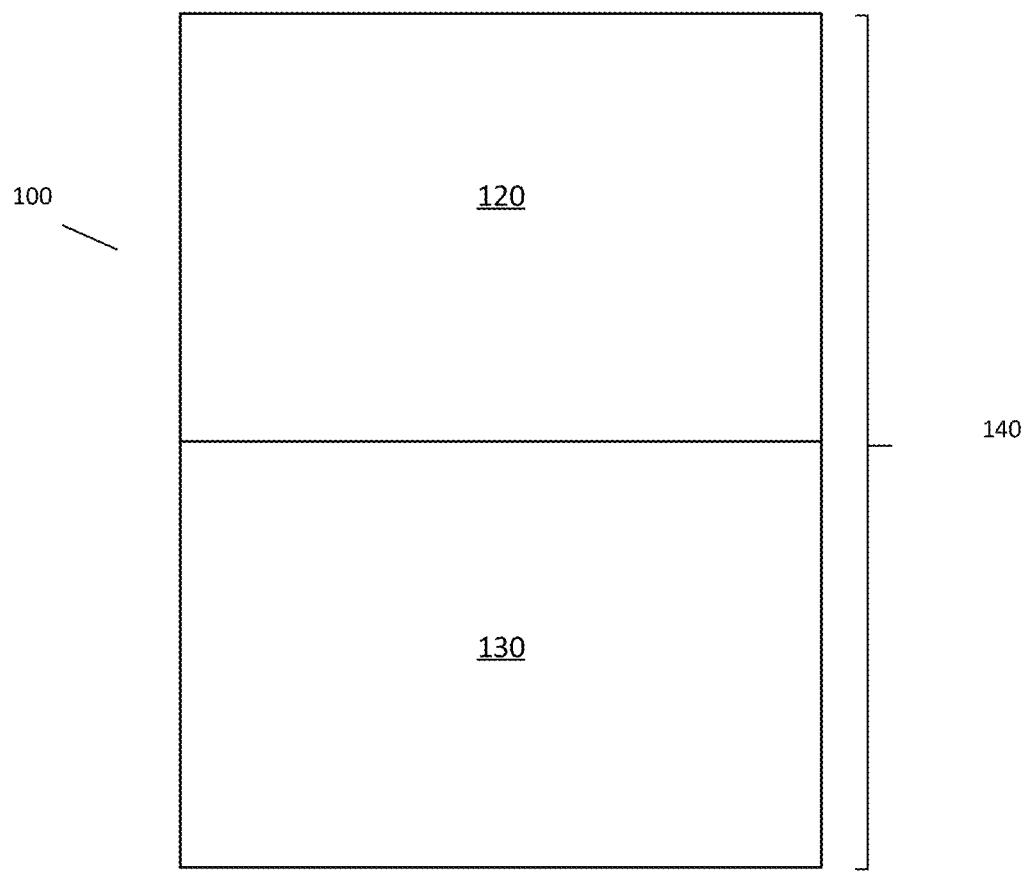
FIG. 1B illustrates a perspective view of the temperature exposure indicator of FIG. 1A, according to an example of the present disclosure.

FIG. 1A illustrates a perspective view of the layers of a temperature exposure indicator prior to customization, according to an example of the present disclosure. Additionally, FIG. 1B illustrates a perspective view of the temperature exposure indicator of FIG. 1A, according to an example of the present disclosure. Optionally, the medium may contain conventional elements of a thermal print media, e.g., by adding thermochromic environmental indicator components to a conventional thermal print media, in FIG. 1A on a portion, for example, the upper half of the media. In the example, the indicator is only applied to a portion of the media, so that the print medium can still be printed using a conventional thermal printing process, either across the whole medium, or as shown in FIG. 1B, or in the portion of the media outside the upper half. Optionally, the medium may have a predetermined pattern, with conventional thermal print media structure in some predetermined locations, and with customizable environmental indicators in other distinct locations. Alternatively, the conventional print media elements and environmental indicators may, in some cases overlap.

Referring to FIGS. 1A and 1B, indicator 100 may include a substrate 140, a data region 130, an indicator region 120, optionally, a clear overlaminate film 110. The data region 130 occupies a portion of the substrate 140 and may be used to contain information about the indicator 100, notices, serial numbers, or any other labeling information, e.g., printed with a conventional thermal printing process. Optionally, indicator 100 may include an adhesive backing layer 160 to apply the indicator 100 to an object.

The clear overlaminate film 110 is a protective component overlaying the indicator region 120 and data region 130. The overlaminate film 110 may be one of Fasson Faslam clear polypropylene, Avery Dennison® DOL series vinyl (PVC), any conformable overlaminate films, Apco PET or BOPP overlaminate films.

In an embodiment, the data region 130 includes a thermal printing thermochromic ("printing thermochromic") composition provided on the substrate 140. This composition, which may be any conventional ink or treatment used in direct thermal printing is configured to change color state, for example from invisible to black when heated above a printing temperature threshold. Generally, the printing temperature threshold will be substantially higher than any ambient temperature the indicator is expected to be exposed to in normal use, and also substantially higher than the environmental indicator threshold temperature, discussed below. In an embodiment, the data region 130 and the indicator region 120 are in separate regions on the substrate 140. Additionally, in an embodiment, a dataform is printed on the data region 130 of the substrate 140 with the direct thermal printer. The dataform can be a word, phrase, symbol or machine readable code.

The substrate 140 of indicator 100 may also include an indicator region 120 where at least one environmental thermochromic composition is provided on an indicator region 120 of the substrate 140. In an embodiment, the environmental thermochromic composition may be applied using variety of techniques, e.g., screen printing, gravure, flexo printing, ink jet printing and/or thermal transfer.

In the illustrated example, the environmental thermochromic composition may be invisible to the human eye when it is first provided on an indicator region 120 of the substrate 140. It will be appreciated that the entire irreversible indicator color-state change cycle might not be human visible, but rather may be entirely, or in part, proceed in a manner that is not visible to the naked human eye, e.g., color state changes in machine readable wavelengths, such as UV, that are not visible to the unaided human eye. In an embodiment, a first portion of the environmental thermochromic composition in the indicator region 120 is treated with heat from thermal print head and the treated portion becomes visible, as illustrated in FIG. 2B, indicia 122. Conversely, a second portion of the environmental thermochromic composition in indicator region 120 remains invisible, as applied to the substrate 140 because it did not receive heat treatment. Because many direct thermal printers have a great deal of control over the printing process, this heat treatment may, if it is desirable, be at a different temperature, or for a longer period of time, than the heat treatment used in conventional thermal printing. In an embodiment, the environmental thermochromic composition located in the indicator region 120 is configured to transition to from a first color state to a second color state when it is heated above a first temperature threshold, and to remain in the high temperature color state. In an embodiment, the indicia 122 subsequently changes appearance when the second portion within the indicator region 120 adjacent to the first portion changes to the second color state when exposed to a temperature above the first predetermined temperature threshold.

In an embodiment, the first temperature threshold temperature is in a range from about 0° C. to about 60° C., from about 5° C. to about 10° C., from about 5° C. to about 15° C., from about 35° C. to about 45° C., from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C.

In some examples, the substrate 140 may be one of (i) paper; (ii) polyester; (iii) nylon; (iv) vinyl; (v) other synthetic polymers. In an additional embodiment, the substrate 140 may be porous materials such as papers & films (e.g., carbon fiber, Teslin synthetic paper, polyethylene ("PE"), polypropylene ("PP"), polytetrafluoroethylene ("PTFE"), polyester, polyethylene, polyolefin, polyimide, vinyl, acrylic film, polypropylene, non-woven nylon, coated and non-coated direct thermal paper, printable polyethylene terephthalate ("PET"), oriented polypropylene ("OPP"), biaxially oriented polypropylene ("BOPP"). In an additional embodiment, the substrate 140 may include printed information identifying the indicator region.

In some examples, the environmental thermochromic composition applied to indicator region 120 is selected from the group of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the environmental thermochromic composition may be one of leuco dye, a micro-encapsulated leuco-dye, microencapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof.

In an embodiment, the conventional printing thermochromic composition may be one of polyoxymethylenemelamine, maleate polymer, ODB-II, Green DCF, Behenic acid methylester, resin, color modifier, bisphenol A derivative, leuco dye, and UV absorber. In an embodiment, the printing thermochromic compositions may also be available in pigment powder form, water-based ink or slurry matrixes. For example, a water based slurry having the components: melamine formaldehyde resin, 3-diethylamino-6-methyl-7, 2,4-xylidinofluoran, water, and aromatic ester may be used.

In an embodiment, the conventional printing thermochromic composition may selected to provide a specific color visible to the human eye. For example, based on the chemistry of the irreversible thermochromic composition selected, when the thermochromic composition is exposed to a temperature at or above a predetermined temperature, the composition transitions from a first color state (invisible) to a second color state (visible), where the color may be red, dark blue, magenta and/or black.

In an embodiment, the environmental thermochromic composition provided in indicator region 120 is configured to provide multiple color states, visible to the human eye when the temperature exposure indicator is exposed to a range of thresholds. In an additional embodiment, multiple environmental thermochromic compositions are provided on the substrate 120, each composition has a respective temperature threshold providing multiple color states, visible to the human eye.

Figure 2A:
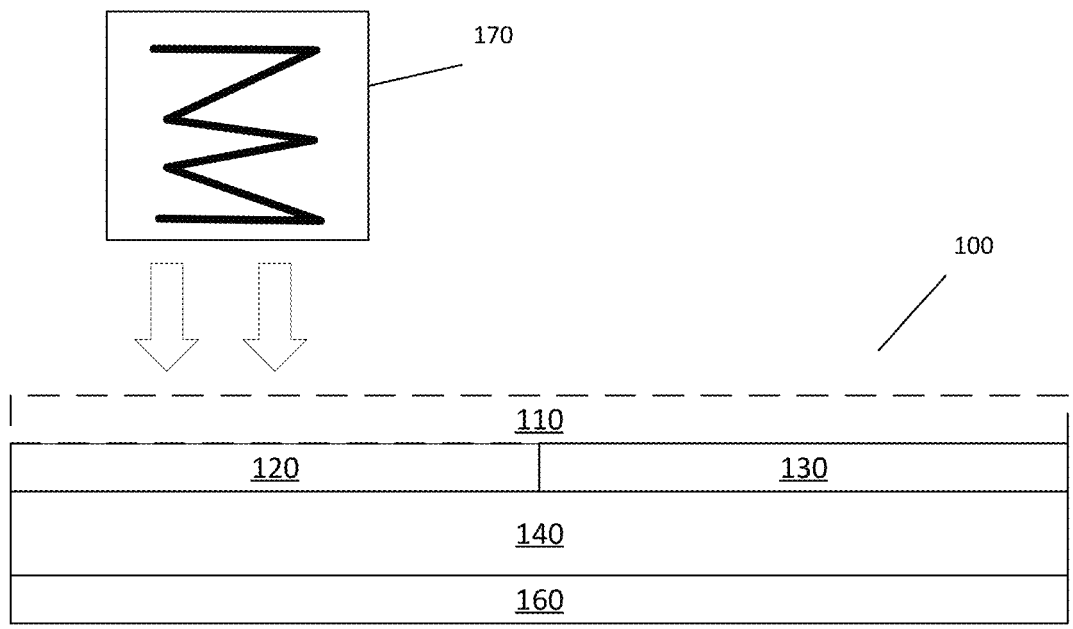
FIG. 2A illustrates a perspective view of the layers of the temperature exposure of FIG. 1A, indicator prior to customization, according to an example of the present disclosure.
Figure 2B:
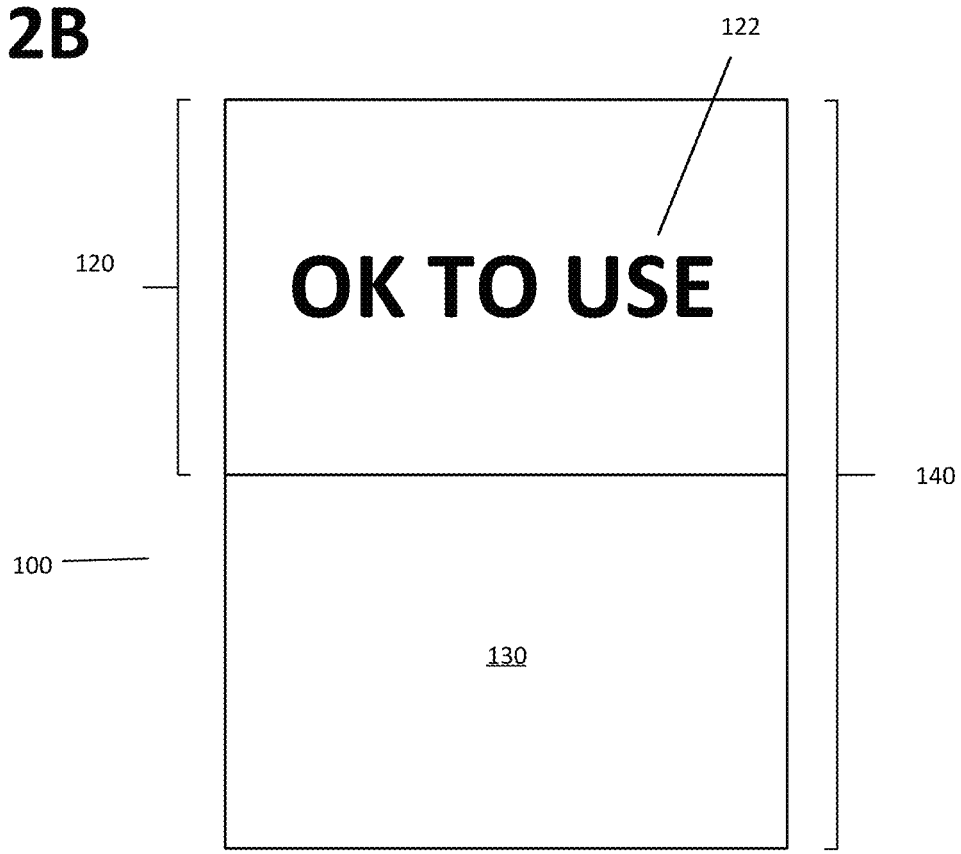
FIG. 2B illustrates a perspective view of the temperature exposure indicator of FIG. 1A, after customization, according to an example of the present disclosure.

FIG. 2A illustrates a perspective view of the layers of the temperature exposure indicator of FIG. 1A, prior to customization, according to an example of the present disclosure. The indicator region 120 of the indicator 100 may be place in a second color state through selective exposure to heat while being fed through a thermal printer 170. In some examples, the temperature threshold for customization, a print temperature, may be from about 0° C. to 300° C., from about 100° C. to 300° C., and from about 200° C. to 300° C. Customization may be achieved by applying a high temperature for a very short interval. e.g., a few milliseconds. Typical thermal print heads of thermal printers 170 have temperatures in the range from about 100° C. to 300° C., which may be tuned downward for select applications to from about 100° C. to 200° C. Any selected point on the media is typically exposed to the thermal print heads for a brief period of time, for example a few milliseconds.

In an embodiment, the entire substrate 140 is accessible to the thermal printer 170 and its printhead(s). In this example, everything outside indicator region 120 is data region 130. Additionally, in an embodiment, printing thermochromic compositions similar to those provided in indicator region 120 may be applied to the entire data region 130 and also selectively placed in a second temperature color state through exposure to the thermal printer (e.g. changes from invisible to visible). In some examples, the thermal printer may include a processor, a memory coupled to the processor and a thermal print head, e.g., a conventional thermal printer with software modifications, for example, ZebraDesigner3 Software, described elsewhere in the present disclosure.

In an embodiment, the substrate 140 is a direct thermal print media, configured to be printed by a thermal printer at or above a print temperature, the print temperature being above the predetermined temperature threshold.

Referring to FIG. 2B, indicator 100 has been customized by being passed through a thermal printer 170. The substrate 140 of indicator 100 may also include an indicator region 120 where at least one environmental thermochromic composition is provided on an indicator region 120 of the substrate 140. As illustrated, the environmental thermochromic composition is invisible to the human eye when it is provided on an indicator region 120 of the substrate 140, although it will be appreciated other approaches may be employed (e.g., invisible wavelengths, or the reverse, or just a color change). In an embodiment, a portion of the environmental thermochromic composition 122 in the indicator region 120 is treated with heat from thermal print head 170 and the treated portion becomes visible. Conversely, other portions of the environmental thermochromic composition in indicator region 120 remains untreated and invisible, as applied to the substrate 140 because it didn't receive heat treatment. The treated region may be selected to provide a human readable indicia within the indicator region 120; the indicia 122 may be formed by the visible material, or in a negative view by having only the background surrounding the indicia being visible, or by the use of contrasting colors or other approaches. The human readable indicia 122, as discussed in later sections of this disclosure, may be any symbol or design chosen by the user of the indicator. For example, the human readable indicia 122 may be a symbol, shape, word, number, message, barcode or any other conceivable design.

Figure 2C:
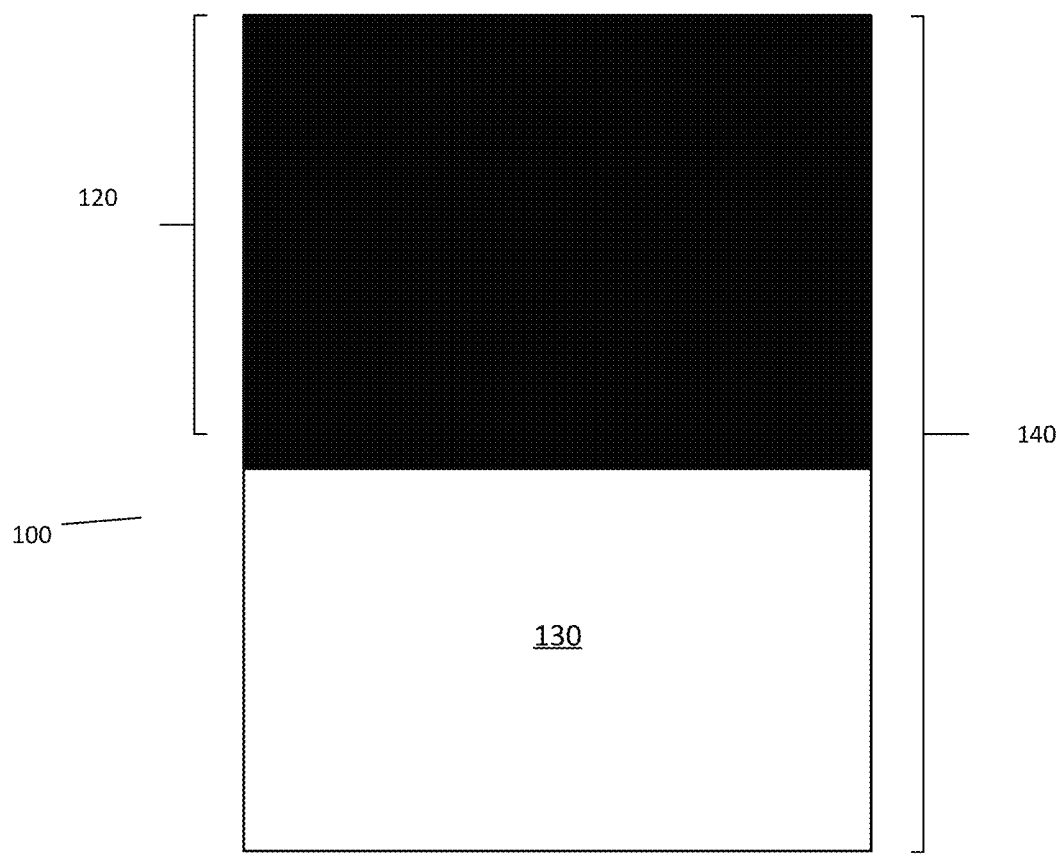
FIG. 2C illustrates a perspective view of the temperature exposure indicator of FIG. 1A, after exposure to an ambient temperature above a predetermined threshold.

FIG. 2C illustrates a perspective view of the temperature exposure indicator of FIG. 1A that has subsequently been exposed to an ambient temperature above the environmental indicator ascending temperature excursion threshold. Referring to FIG. 2C, indicator 100 has experienced a temperature excursion through being exposed to a temperature equal to or greater than a predetermined temperature threshold. In an embodiment, the predetermined threshold temperature is in a range from about 0° C. to about 60° C., from about 5° C. to about 10° C., from about 5° C. to about 15° C., from about 35° C. to about 45° C., from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C.

Upon the indicator 100 being exposed to a temperature equal to or greater than a predetermined temperature threshold, the environmental thermochromic composition in the second portion of the indicator region 120 that was not treated by the thermal printer 170 of FIG. 2A, transitions to the second color state and becomes visible to the human eye. Therefore, because the remaining portion of the environmental thermochromic composition in the indicator region 120 transitions from a first color state to a second color state, the indicia 122 of "OK TO USE" located in indicator region 120 which is already in the second color state because of being heat treated by thermal printer 170, is no longer visible to the human eye. This provides indication that temperature excursion above a predetermined temperature threshold has occurred. In an embodiment, when exposed to an ambient temperature between the predetermined temperature threshold and the print temperature, the second portion of the indicator region 120 is placed in the second color state thereby changing the appearance of the indicia 122.

Figure 3A:
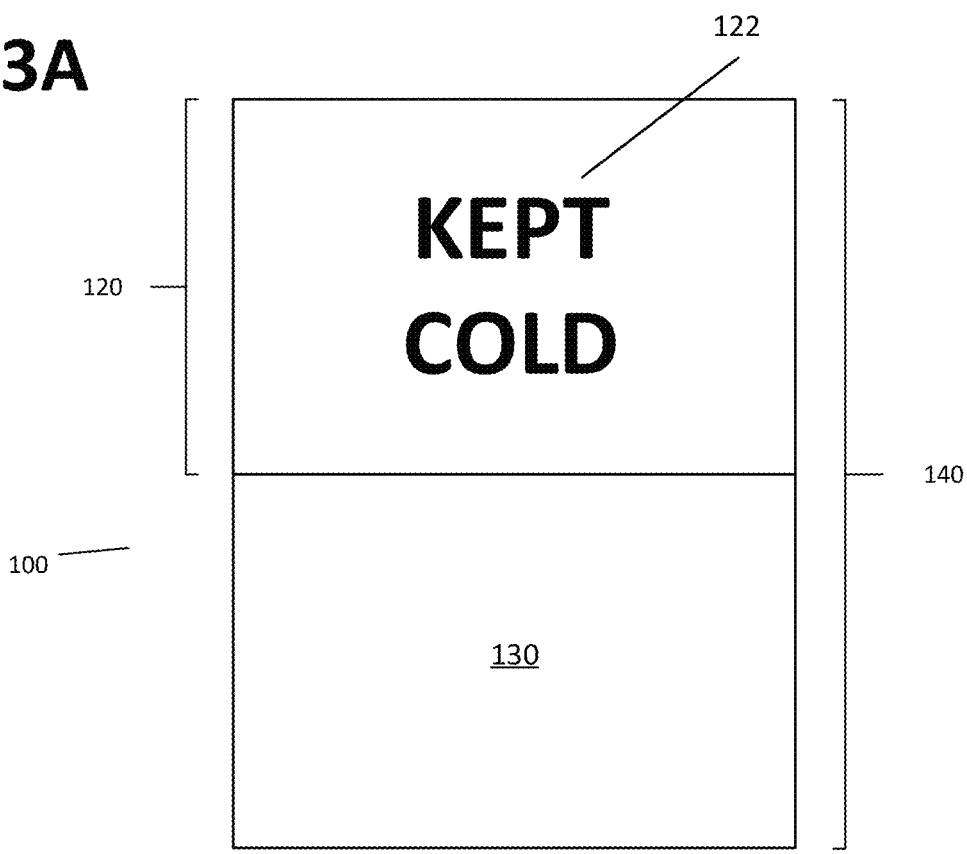
FIG. 3A illustrates a perspective view of an additional example of a temperature exposure indicator of FIG. 1A, after customization, according to an example of the present disclosure.
Figure 3B:
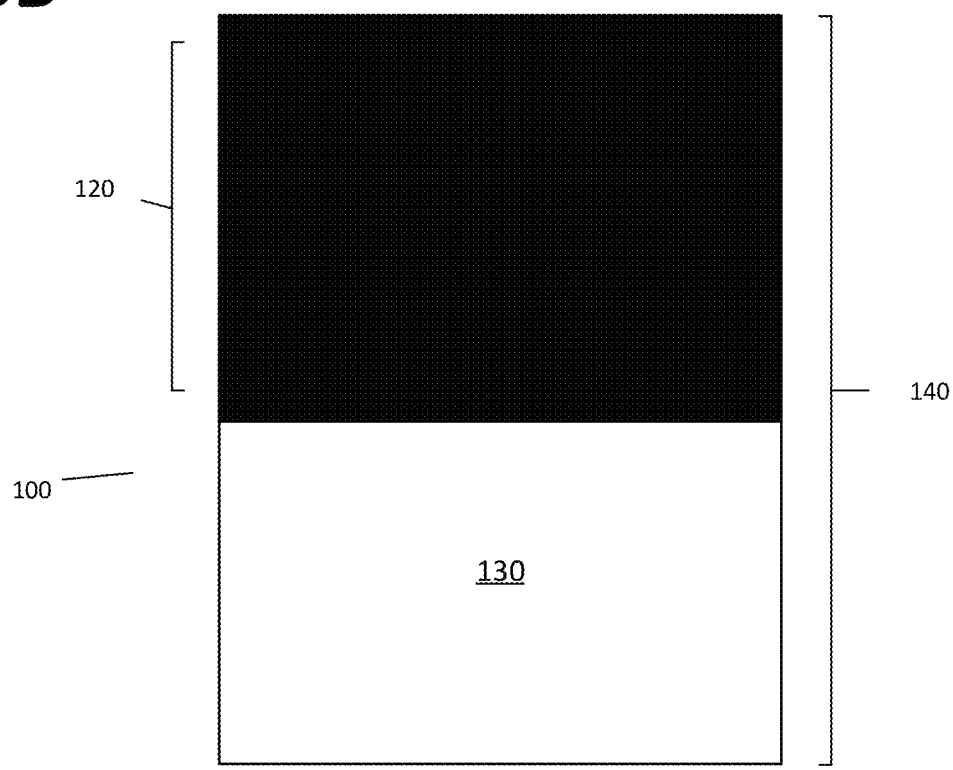
FIG. 3B illustrates a perspective view of an additional example of the temperature exposure indicator of FIG. 1A, after exposure to an ambient temperature above a predetermined threshold.

FIG. 3A illustrates a perspective view of an additional example of a temperature exposure indicator of FIG. 1A, after customization, according to an example of the present disclosure. Additionally, FIG. 3B illustrates a perspective view of an additional example of the temperature exposure indicator of FIG. 1A, after exposure to an ambient temperature above a predetermined threshold. Upon the indicator 100 being exposed to a temperature equal to or greater than a predetermined temperature threshold, the environmental thermochromic composition in the second portion of the indicator region 120 that was not treated by the thermal printer 170 of FIG. 2A, transitions to the second color state and becomes visible to the human eye. Therefore, because the remaining environmental thermochromic composition in the indicator region 120 transitions from a first color state to a second color state, the indicia 122 of "KEPT COLD" located in indicator region 120 which is already in the second color state because of being heat treated by thermal printer 170, is no longer visible to the human eye. This provides indication that temperature excursion above a predetermined temperature threshold has occurred and a well-trained end user of the product becomes aware that the object utilizing the indicator 100 may have been damaged by the temperature excursion.

Figure 4A:
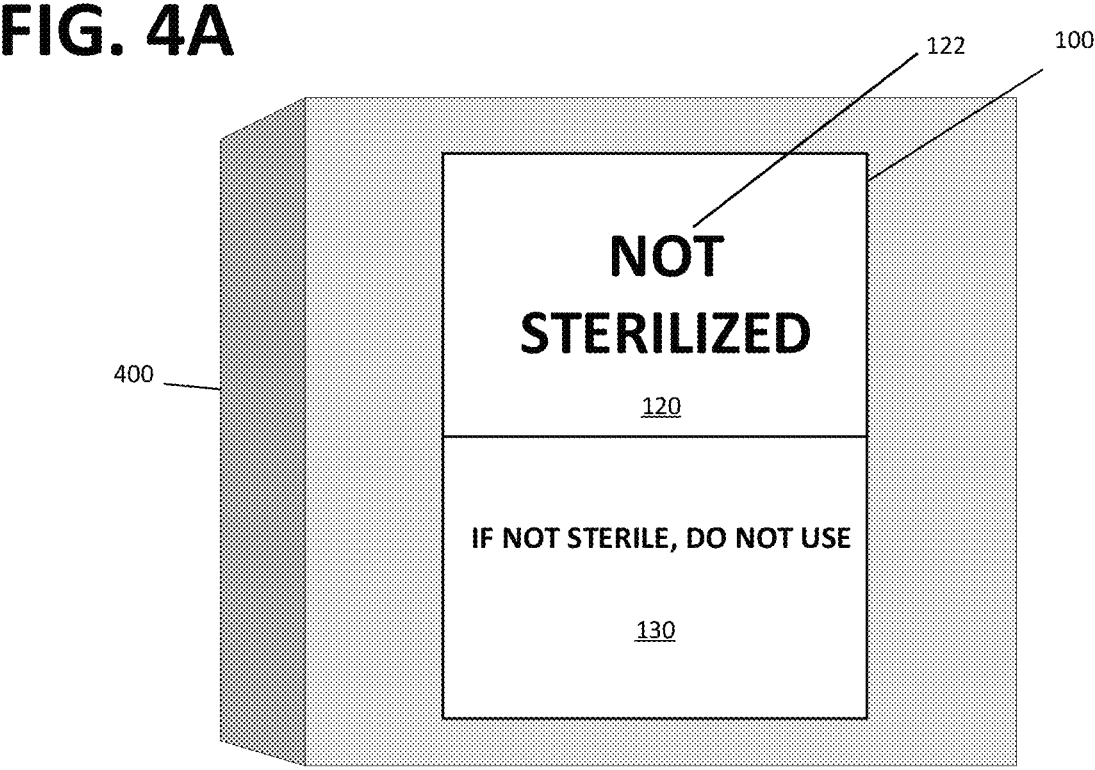
FIG. 4A illustrates a perspective view of an additional example of a temperature exposure indicator of FIG. 1A, after customization, according to an example of the present disclosure.

FIG. 4A illustrates a perspective view of an additional example of a temperature exposure indicator of FIG. 1A, after customization and adhered to a host product, according to an example of the present disclosure. In an embodiment, the indicator of FIG. 4A may be used to indicate if a host object 400 has been exposed to a temperature greater than or equal to a sterilizing temperature according to an example of the present disclosure. In embodiment, data region 130 includes a dataform that indicates "IF NOT STERILE, DO NOT USE." The dataform with data region 130 consists of the printing thermochromic composition and is configured to change color state from a third color state to a fourth color state when heated above a second temperature threshold.

Figure 4B:
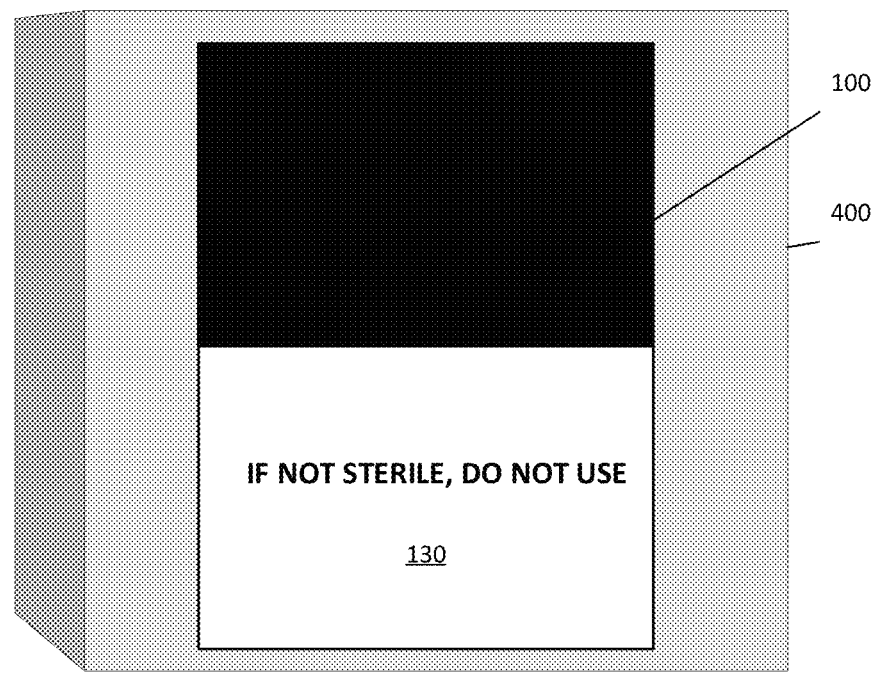
FIG. 4B illustrates a perspective view of an additional example of the temperature exposure indicator of FIG. 1A, after exposure to an ambient temperature above a predetermined threshold.

Additionally, FIG. 4B illustrates a perspective view of an additional example of the temperature exposure indicator of FIG. 1A, after exposure to an ambient temperature above a predetermined threshold. Upon the indicator 100 being exposed to a temperature equal to or greater than a predetermined temperature threshold, the environmental thermochromic composition in the second portion of the indicator region 120 that was not treated by the thermal printer 170 of FIG. 2A, transitions to the second color state and becomes visible to the human eye. Therefore, because the remaining environmental thermochromic composition in the indicator region 120 transitions from a first color state to a second color state, the indicia 122 of "NOT STERILIZED" located in indicator region 120 which is already in the second color state because of being heat treated by thermal printer 170, is no longer visible to the human eye. This provides indication that temperature excursion above a predetermined temperature threshold has occurred and a well-trained end user of the host product 400 becomes aware that the host product 400 utilizing the indicator 100 has been exposed to a temperature sufficient to sterilize the host product 400.

Figure 5A:
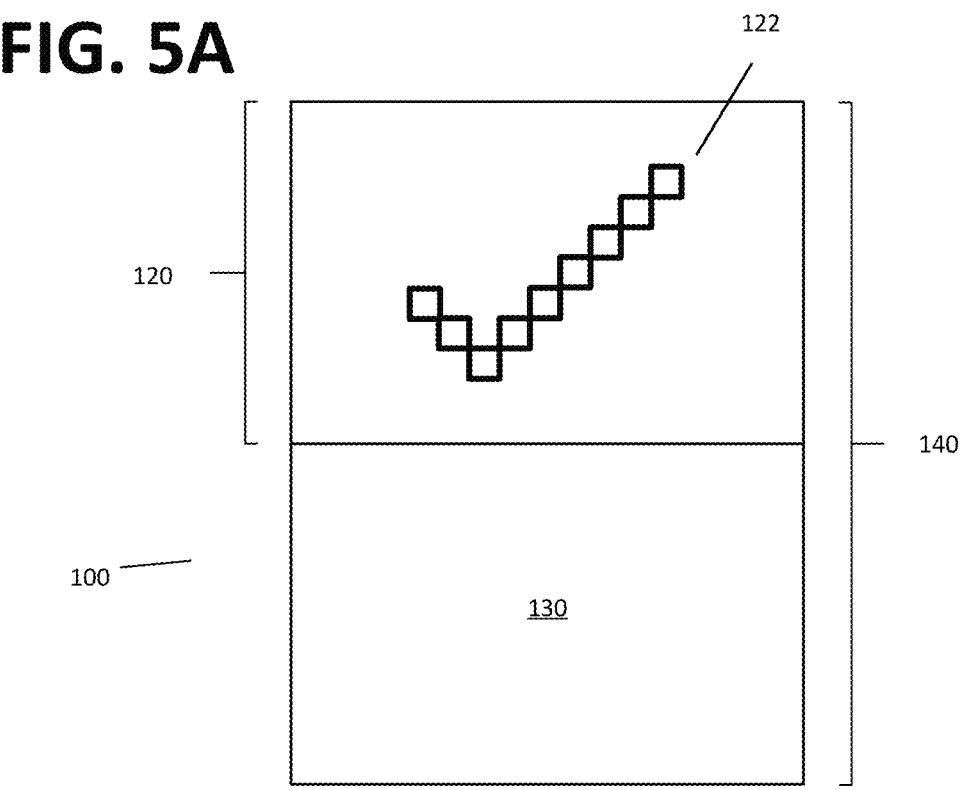
FIG. 5A illustrates a perspective view of an additional example of a temperature exposure indicator of FIG. 1A, utilizing a customized pattern, after customization, according to an example of the present disclosure.

FIG. 5A illustrates a perspective view of an additional example of a temperature exposure indicator of FIG. 1A, utilizing a customized pattern, after customization, according to an example of the present disclosure. In an embodiment, a customized pattern temperature exposure indicator 100 can be achieved by coating an environmental thermochromic composition in various patterns in the indicator region 120 of substrate which become revealed upon customization through exposure to a print temperature using the thermal printer 170 of FIG. 2A.

In an embodiment, an environmental thermochromic composition is provided on the substrate 140 in a specific pattern (e.g. a check mark, an "X", a cross out symbol) that is created and becomes apparent upon customization with thermal printhead 170 of FIG. 2A. Once the indicator 100 is customized through exposure exposed to temperatures above a predetermined threshold, an outline of a customized image will be revealed.

Figure 5B:
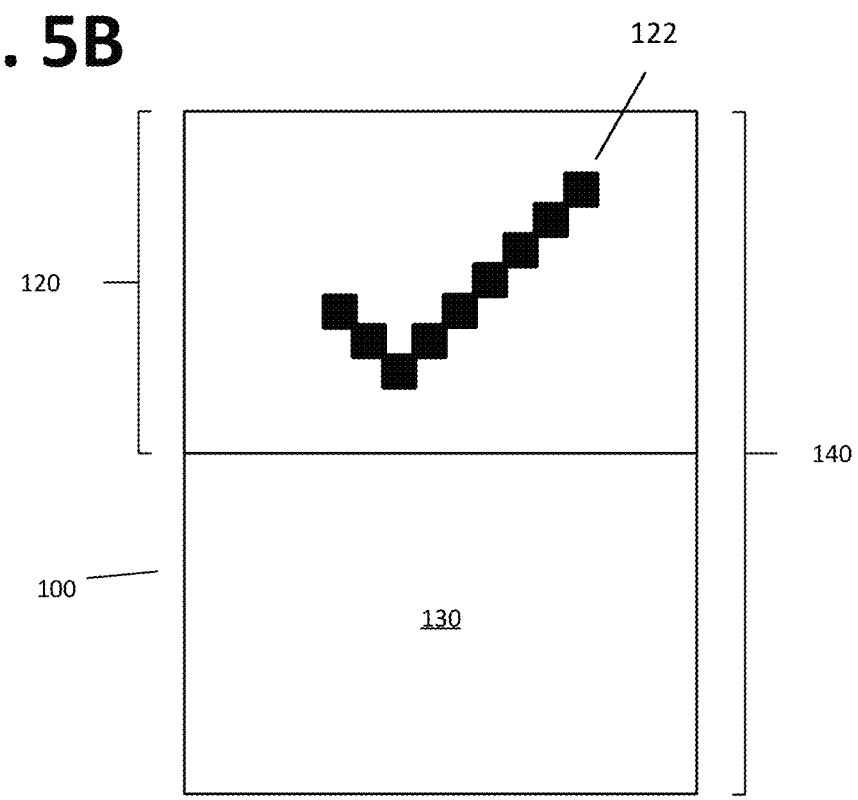
FIG. 5B illustrates a perspective view of an additional example of the temperature exposure indicator of FIG. 1A, utilizing a customized pattern, after exposure to an ambient temperature above a predetermined threshold.

FIG. 5B illustrates a perspective view of an additional example of the temperature exposure indicator of FIG. 1A, utilizing a customized pattern, after exposure to an ambient temperature above a predetermined threshold. Referring to FIG. 5B, indicator 100 has experienced a temperature excursion through being exposed to a temperature equal to or greater than a predetermined temperature threshold. In an embodiment, the predetermined threshold temperature is in a range from about 0° C. to about 60° C., from about 5° C. to about 10° C., from about 5° C. to about 15° C., from about 35° C. to about 45° C., from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C.

Upon the indicator 100 being exposed to a temperature equal to or greater than a predetermined temperature threshold, the environmental thermochromic composition in the second portion of the indicator region 120 that was not treated by the thermal printer 170 of FIG. 2A, transitions to the second color state and becomes visible to the human eye. Therefore, because the remaining environmental thermochromic composition in the indicator region 120 transitions from a first color state to a second color state, the indicia 122 checkmark outline located in indicator region 120 which is already in the second color state because of being heat treated by thermal printer 170, becomes filed in and is visible to the human eye. This provides indication that temperature excursion above a predetermined temperature threshold has occurred.

Figure 6A:
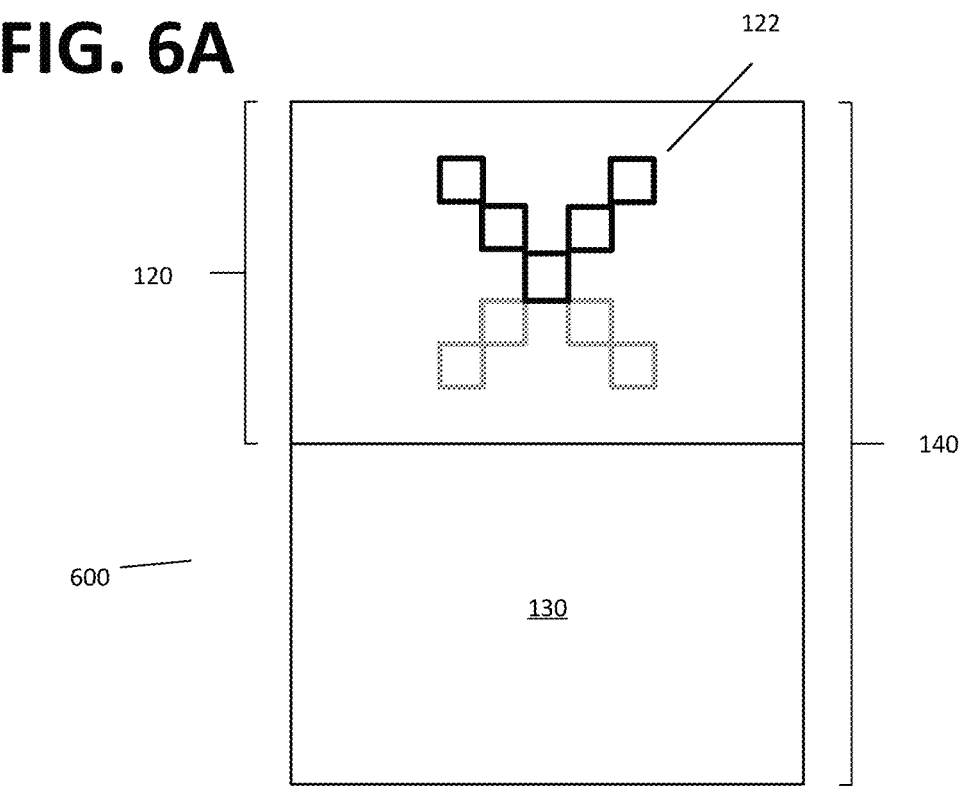
FIG. 6A illustrates a perspective view of an additional example of a temperature exposure indicator of FIG. 1A, utilizing a multi-temperature customized pattern, after customization, according to an example of the present disclosure.

FIG. 6A illustrates a perspective view of an additional example of a temperature exposure indicator of FIG. 1A, utilizing a multi-temperature customized pattern, after customization, according to an example of the present disclosure. In an embodiment, similar to FIG. 5A, a customized pattern multi-temperature exposure indicator 600 can be achieved by coating multiple environmental thermochromic compositions, with varying thermochromic properties, in various patterns in the indicator region 120 of substrate 140 which become revealed, revealing indicia 122, upon customization through exposure to a print temperature using the thermal printer 170 of FIG. 2A. In an embodiment, an environmental thermochromic composition is provided on the substrate 140 in a specific pattern (e.g. a check mark, an "X", a cross out symbol) that is created and becomes apparent upon customization with thermal printhead 170 of FIG. 2A. In an embodiment, in order to achieve a multi-temperature exposure indictor 600, at least two different environmental thermochromic compositions may be utilized. In an example utilizing two different environmental thermochromic compositions, the second environmental thermochromic composition provided on the substrate 140 within the indicator region 120, the second environmental thermochromic composition is configured to change color state from a third color state to a fourth color state when heated above a second temperature threshold, wherein the second temperature threshold is higher than the first temperature threshold. However, regardless of the differences in temperature between the first temperature threshold and the second temperature threshold, both of the environmental thermochromic compositions become visible upon exposure to a print heat through customization with thermal printhead 170 of FIG. 2A, exposing indicia 122 which is the outline of the selected pattern.

In an embodiment, the first and second temperature threshold temperature is in a range from about 0° C. to about 60° C., from about 5° C. to about 10° C., from about 5° C. to about 15° C., from about 35° C. to about 45° C., from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C.

In an embodiment, the second temperature threshold is higher than the first temperature threshold.

Figure 6B:
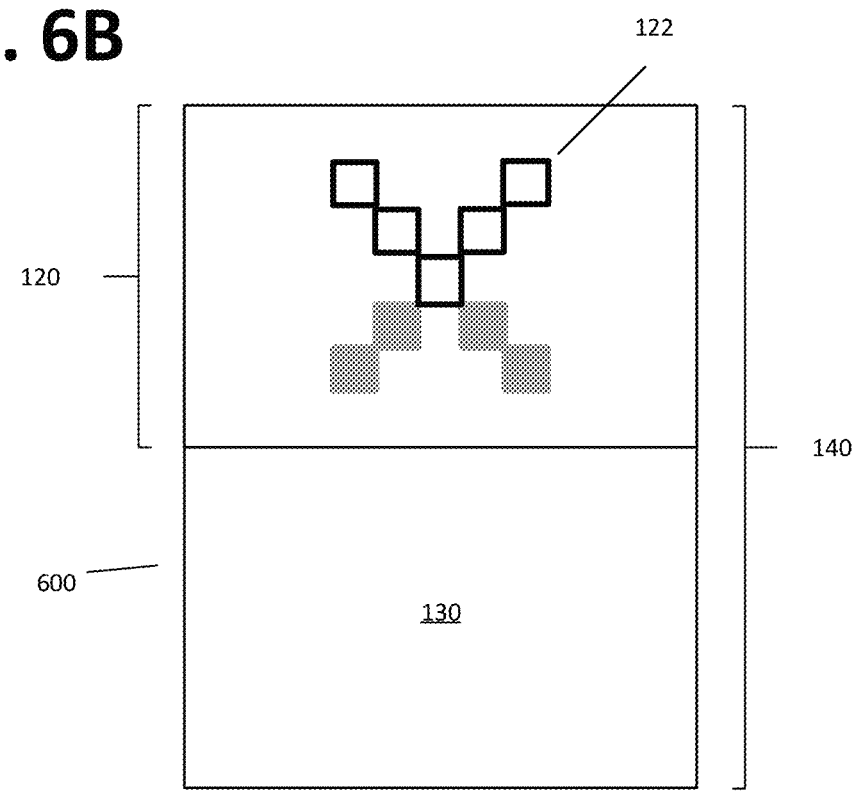
FIG. 6B illustrates a perspective view of an additional example of the temperature exposure indicator of FIG. 1A, utilizing a multi-temperature customized pattern, after exposure to an ambient temperature above a first predetermined threshold.

FIG. 6B illustrates a perspective view of an additional example of the temperature exposure indicator of FIG. 1A, utilizing a multi-temperature customized pattern, after exposure to an ambient temperature above a first predetermined threshold. Referring to FIG. 6B, in an embodiment, indicator 600 has been exposed to an ambient temperature above a first temperature threshold temperature, yet below a second temperature threshold temperature. As a result, only the portion of the symbol indicator 122 that contains the first environmental thermochromic composition transitions from the first color state (invisible) to the second color state (visible) upon exposure to a temperature above the first temperature threshold temperature. This provides indication to a well-trained end user that the object utilizing indicator 600 has been exposed to an ambient temperature above a first temperature threshold yet below a second temperature threshold temperature. Since the first a second temperature thresholds are predetermined and known to the well-trained user, the user will know the specific temperatures that the indicator 600 has been exposed to and be able to make informed decisions regarding the condition of the objection utilizing the indicator 600.

Figure 6C:
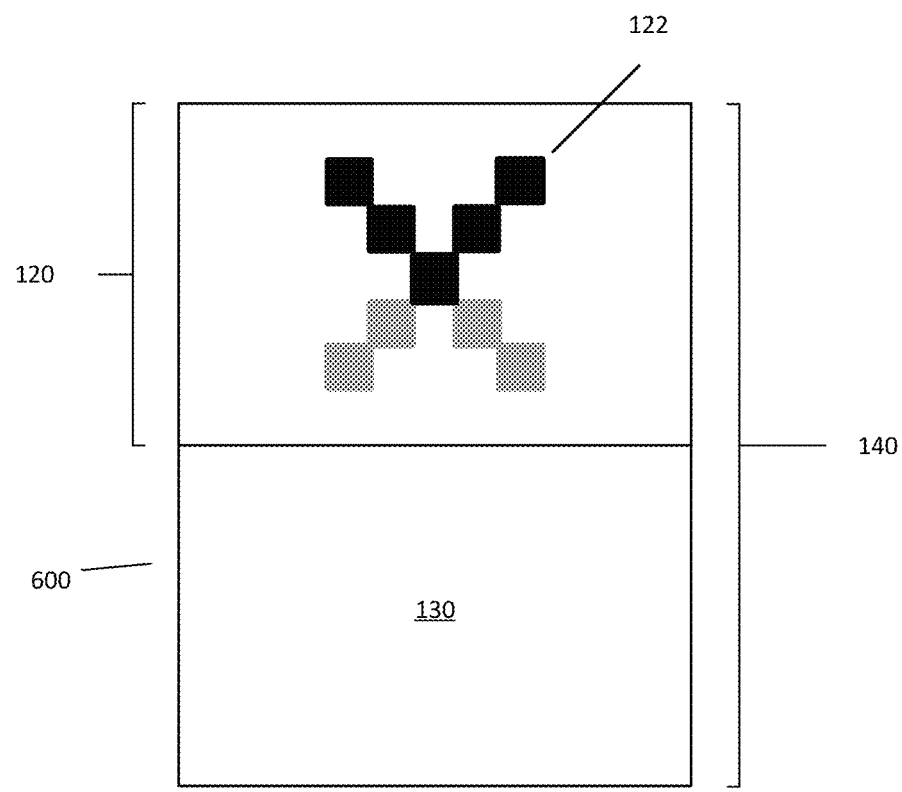
FIG. 6C illustrates a perspective view of an additional example of the temperature exposure indicator of FIG. 1A, utilizing a multi-temperature customized pattern, after exposure to an ambient temperature above a second predetermined threshold.

FIG. 6C illustrates a perspective view of an additional example of the temperature exposure indicator of FIG. 1A, utilizing a multi-temperature customized pattern, after exposure to an ambient temperature above both a first predetermined temperature threshold and a second predetermined temperature threshold. Referring to FIG. 6C, in an embodiment, indicator 600 has been exposed to an ambient temperature above a first temperature threshold temperature and a second temperature threshold temperature. As a result, both the portion of the symbol indicator 122 that contains the first environmental thermochromic composition transitions from the first color state (invisible) to the second color state (visible) and the second environmental thermochromic composition transitions from a third color state (invisible) to a fourth color state (visible) but with a different color than the second color state based on the environmental thermochromic composition selected. Upon both environmental thermochromic compositions transitioning from first color state to the second color state (visible) and third color state to a fourth color state, respectively, symbol indicia 122 is entirely colored in. This provides indication to a well-trained end user that the object utilizing indicator 600 has been exposed to an ambient temperature above a first temperature threshold and second temperature threshold temperature. Since the first a second temperature thresholds are predetermined and known to the well-trained user, the user will know the specific temperatures that the indicator 600 has been exposed to and be able to make informed decisions regarding the condition of the object utilizing the indicator 600.

Figure 7A:
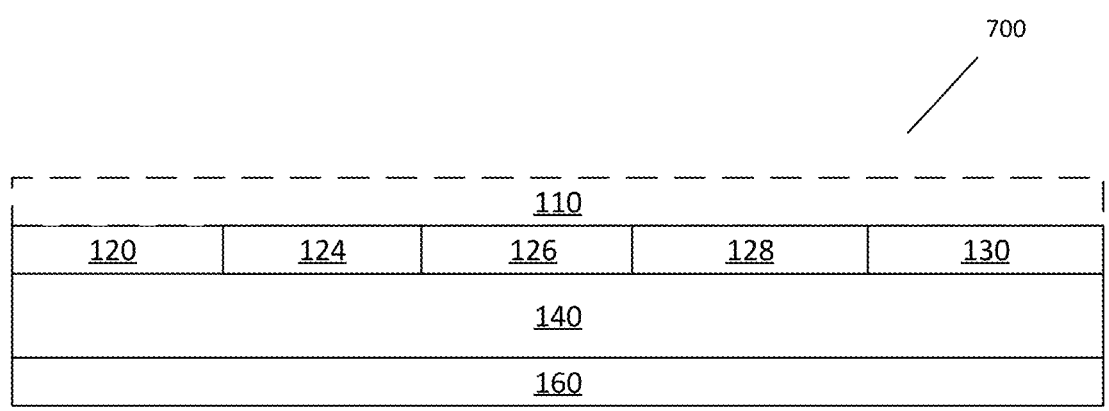
FIG. 7A illustrates a perspective view of the layers of a multi-temperature exposure indicator prior to customization, according to an example of the present disclosure.
Figure 7B:
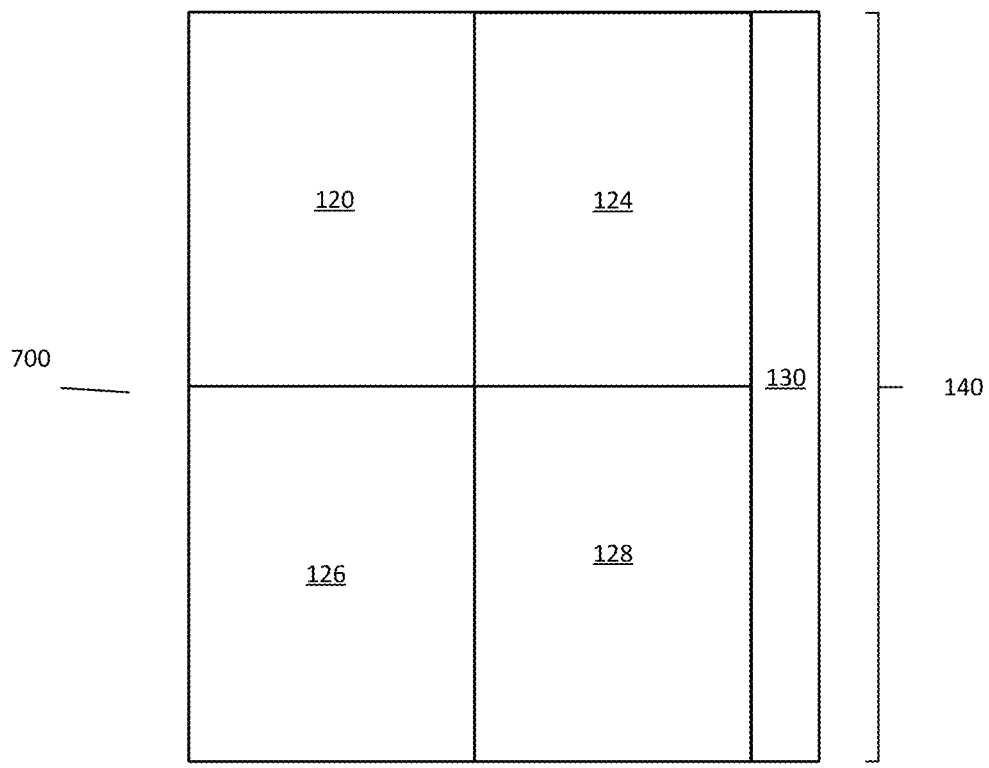
FIG. 7B illustrates a perspective view of the multi-temperature exposure indicator of FIG. 7A, according to an example of the present disclosure.

FIG. 7A illustrates a perspective view of the layers of a multi-temperature exposure indicator prior to customization, according to an example of the present disclosure. A multi-temperature exposure indicator can be achieved by providing at least two, but in an embodiment, four different environmental thermochromic compositions immediately adjacent one another on a substrate. Referring to FIGS. 7A and 7B, in an embodiment, similar to indicator 100 of FIGS. 1A and 1B, indicator 700 may include a substrate 140, a data region 130, and, optionally, a clear overlaminate film 110. The data region 130 occupies a portion of the substrate 140 and may be used to contain a printing thermochromic composition and the printing thermochromic composition may change color states from a third color state to a fourth color state when heated above a second temperature threshold. Additionally, indicator 100 may include an adhesive backing layer 160 to apply the indicator 100 to an object.

The substrate 140 of indicator 700 may also include an indicator region 120 where at least one environmental thermochromic composition is provided on an indicator region 120 of the substrate 140. In an embodiment, substrate 140 may include a second, third and fourth indicator region 124, 126 and 128, respectively, where a second, third and fourth environmental thermochromic composition is provided that are all different from each other. In an embodiment, the environmental thermochromic compositions may be provided on the substrate 140 using one of the following techniques: screen printing, gravure, flexo printing, ink jet printing and/or thermal transfer. In an embodiment, indicator regions 120, 124, 126 and 128 are immediately adjacent each other on substrate 140.

Figure 7C:
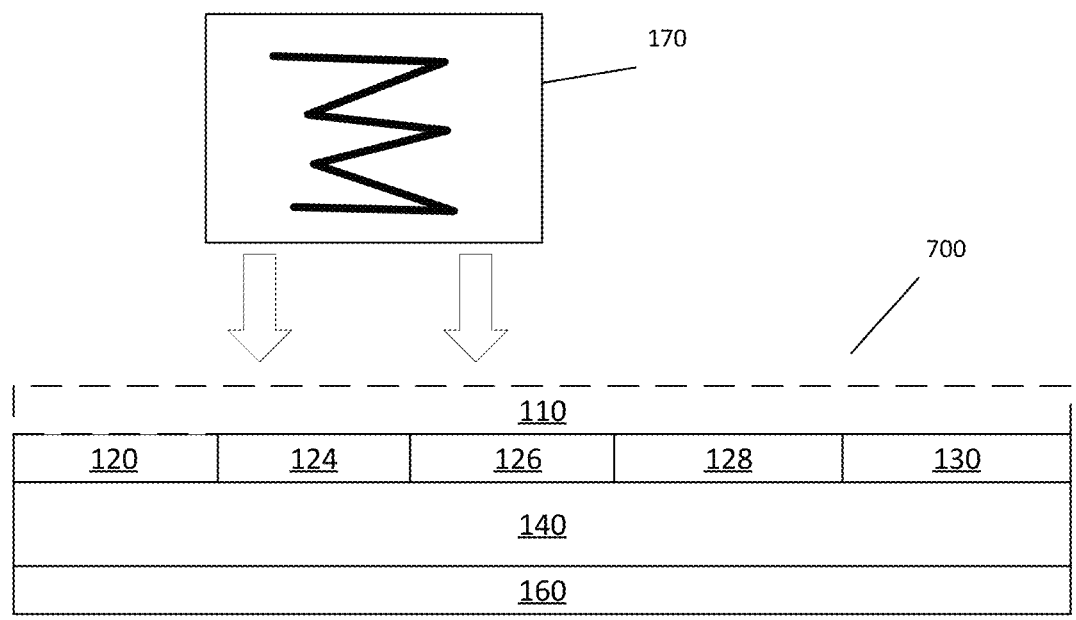
FIG. 7C illustrates a perspective view of the layers of a multi-temperature exposure indicator immediately prior to customization with the print head, according to an example of the present disclosure.

FIG. 7C illustrates a perspective view of the layers of a multi-temperature exposure indicator, immediately prior to customization with the print head, according to an example of the present disclosure. Referring to FIG. 7C, in an embodiment, similar to indicator 100 in FIG. 2A, indicator regions 120, 124, 126 and 128 of indicator 700 may be place in a second color state through selective exposure to heat while being fed through a thermal printer 170. In some examples, the temperature threshold for customization, a print temperature, may be from about 0° C. to 300° C., from about 100° C. to 300° C., and from about 200° C. to 300° C. Customization may be achieved by applying a high temperature for a very short interval. e.g., a few milliseconds. Typical thermal print heads of thermal printers 170 have temperatures in the range from about 100° C. to 300° C., which may be tuned downward for select applications to from about 100° C. to 200° C. Any selected point on the media is typically exposed to the thermal print heads for a brief period of time, for example a few milliseconds.

In an embodiment, the entire substrate 140 is accessible to the thermal printer 170 and its printhead(s). In this example, everything outside indicator regions 120,124, 126 and 128 is data region 130. Additionally, in an embodiment, printing thermochromic compositions similar to those provided in indicator regions 120,124, 126 and 128, may be applied to the entire data region 130 and also selectively placed in a fourth temperature color state through exposure to the thermal printer (e.g. changes from invisible to visible). In some examples, the thermal printer may include a processor, a memory coupled to the processor and a thermal print head, e.g., a conventional thermal printer with software modifications, for example, ZebraDesigner3 Software, described elsewhere in the present disclosure.

In an embodiment, the color the first color state and the second color state of each of the four different environmental thermochromic compositions provided in indicator regions 120,124, 126 and 128 are visibly contrasting in comparison to each of the four different environmental thermochromic compositions.

Figure 7D:
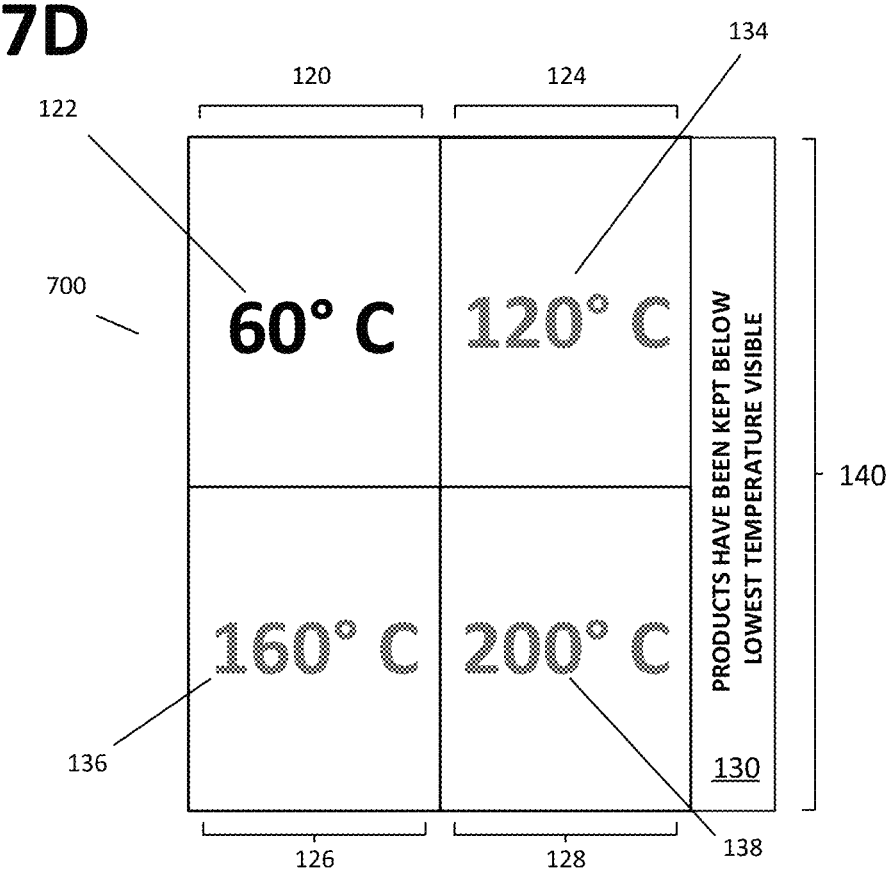
FIG. 7D illustrates a perspective view of the multi-temperature exposure indicator of FIG. 7A, after customization and prior to exposure to an ambient temperature above a predetermined threshold, according to an example of the present disclosure.

FIG. 7D illustrates a perspective view of the multi-temperature exposure indicator of FIG. 7A, after customization and prior to exposure to an ambient temperature above a predetermined threshold, according to an example of the present disclosure. Referring to FIG. 7D, indicator 700 has been customized by being passed through a thermal printer 170. The substrate 140 of indicator 700 includes a plurality of indicator regions 120, 124, 126 and 128 where at least four environmental thermochromic compositions are provided in indicator regions 120, 124, 126 and 128, respectfully. The at least four environmental thermochromic compositions are invisible to the human eye when provided on the plurality of indicator regions 120, 124, 126 and 128, of the substrate 140. In an embodiment, a portion of the at least four environmental thermochromic compositions 122, 134, 136 and 138 in the plurality of indicator regions 120, 124, 126 and 128, respectfully, are treated with heat from thermal print head 170 and the treated portions become visible. Conversely, other portions of the environmental thermochromic composition in the plurality of indicator regions 120, 124, 126 and 128, remain untreated and invisible, as applied to the substrate 140 because it didn't receive heat treatment. The treated regions may be selected to provide a human readable indicia within the plurality of indicator regions 120, 124, 126 and 128, the indicia 122, 134, 136 and 138 respectfully, and may be formed by the visible material, or in a negative view by having only the background surrounding the indicia being visible, or by the use of contrasting colors or other approaches according to other sections of this disclosure.

In an embodiment, data region 130 includes a dataform that indicates "PRODUCT HAVE BEEN KEPT BELOW LOWEST TEMPERATURE VISIBLE." The dataform within data region 130 consists of the printing thermochromic composition and is configured to change color state from a third color state to a fourth color state when heated above a second temperature threshold. The second threshold temperature, the print temperature, is significantly high than the first temperature threshold of the plurality of environmental thermochromic compositions in the plurality of indicator regions 120, 124, 126 and 128, respectively.

Figure 7E:
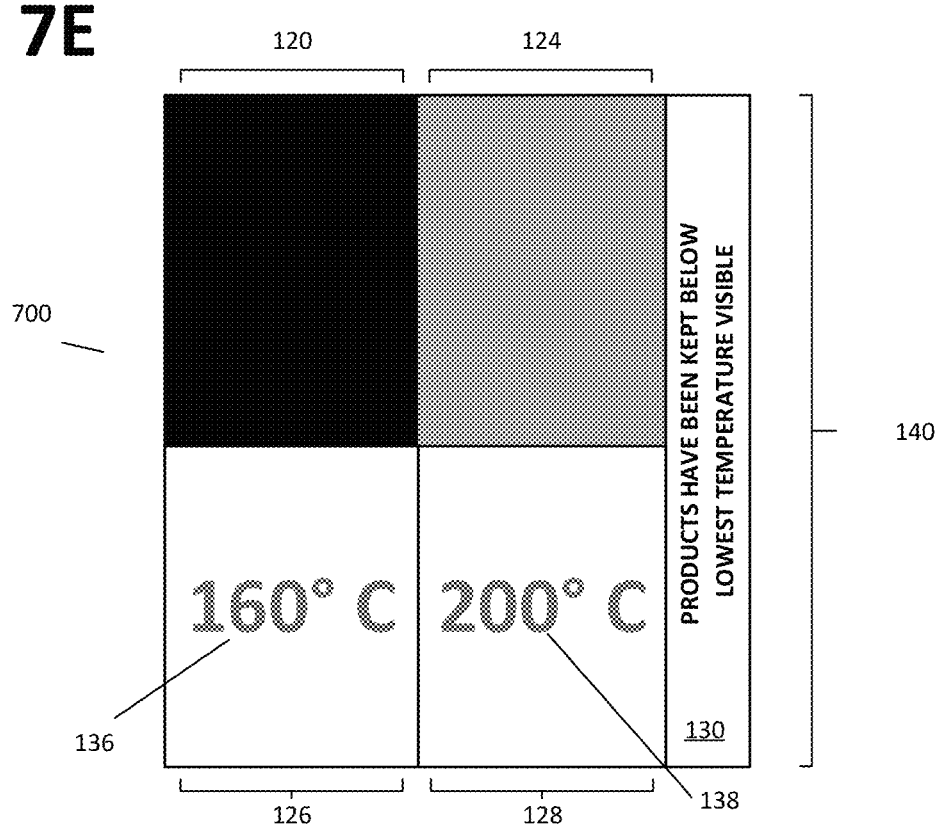
FIG. 7E illustrates a perspective view of the multi-temperature exposure indicator of FIG. 7A, after exposure to an ambient temperature above a first and second predetermined threshold, yet below a third and fourth predetermined threshold.

FIG. 7E illustrates a perspective view of the multi-temperature exposure indicator of FIG. 7A, after exposure to an ambient temperature above a first and second predetermined threshold and below a third and fourth predetermined threshold. Referring to FIG. 7E, indicator 700 has experienced a temperature excursion through being exposed to an ambient temperature equal to or greater than a first predetermined temperature threshold, a second predetermined temperature threshold. However, the temperature excursion was not equal to or above a third predetermined temperature threshold and a fourth predetermined temperature threshold. Each predetermined temperature threshold is dependent and directly related to the specific environmental thermochromic composition provided on the plurality of indicator regions 120, 124, 126 and 128.

In an embodiment, the first, second, third and fourth predetermined threshold temperatures are in a range from about 0° C. to about 60° C., from about 5° C. to about 10° C., from about 5° C. to about 15° C., from about 35° C. to about 45° C., from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C. In an embodiment, the fourth predetermined threshold temperature is greater than the third predetermined threshold which is also greater than the second predetermined threshold temperature, which is greater than the first predetermined threshold temperature.

Still referring to FIG. 7E, in an embodiment, a temperature excursion has occurred that is above the first and second predetermined threshold temperature of the environmental thermochromic composition provided in indicator region 120 and 124 but below the third and fourth predetermined threshold temperatures of the different environmental thermochromic composition provided in the third and fourth indicator region 126 and 128, respectfully. In that embodiment, indicia 136 and 138 of predetermined threshold temperature, for example "160° C." and "200° C." located in third indicator region 126 and fourth indicator region 128 would remain visible to the human eye since the environmental thermochromic composition in the second portion of the third indicator region 126 and fourth indicator region 128 that was not treated by the thermal printer, has not transitioned to the second color state. However, in this embodiment, since a heat excursion above both the first and second predetermined threshold temperature of the environmental thermochromic composition provided in indicator regions 120 and 124 has occurred, the second portion of the first indicator region 120 and second indicator region 124 that was not treated by the thermal printer, has transitioned to the second color state. Therefore, as a result of the second portion of the first indicator region 120 and second indicator region 124 that was not treated by the thermal printer transitioning to the second color state, the indicia 122 and 124 of the specific predetermined threshold temperatures located in indicator regions 120 and 124, are no longer visible to the human eye. This provides indication that a temperature excursion above the stated predetermined threshold temperature has occurred and a well-trained end user of the host product utilizing indicator 700 becomes aware that the host product utilizing the indicator has been exposed to a temperature above the stated predetermined threshold In an embodiment, upon the indicator 700 being exposed to a temperature equal to or greater than all four predetermined threshold temperatures, the environmental thermochromic composition in the second portion of the plurality of indicator regions 120, 124, 126 and 128 that were not treated by the thermal printer 170 of FIG. 7C, transition to the second color state and become visible to the human eye. Therefore, because the remaining environmental thermochromic composition in the plurality of indicator regions 120, 124, 126 and 128, transitions from a first color state to a second color state, the indicia 122, 134, 136 and 138 of the predetermined threshold temperature located in plurality of indicator regions 120, 124, 126 and 128, which are already in the second color state because of being heat treated by thermal printer 170, are no longer visible to the human eye. This provides indication that temperature excursion above all four predetermined threshold temperatures has occurred.

Figure 8A:
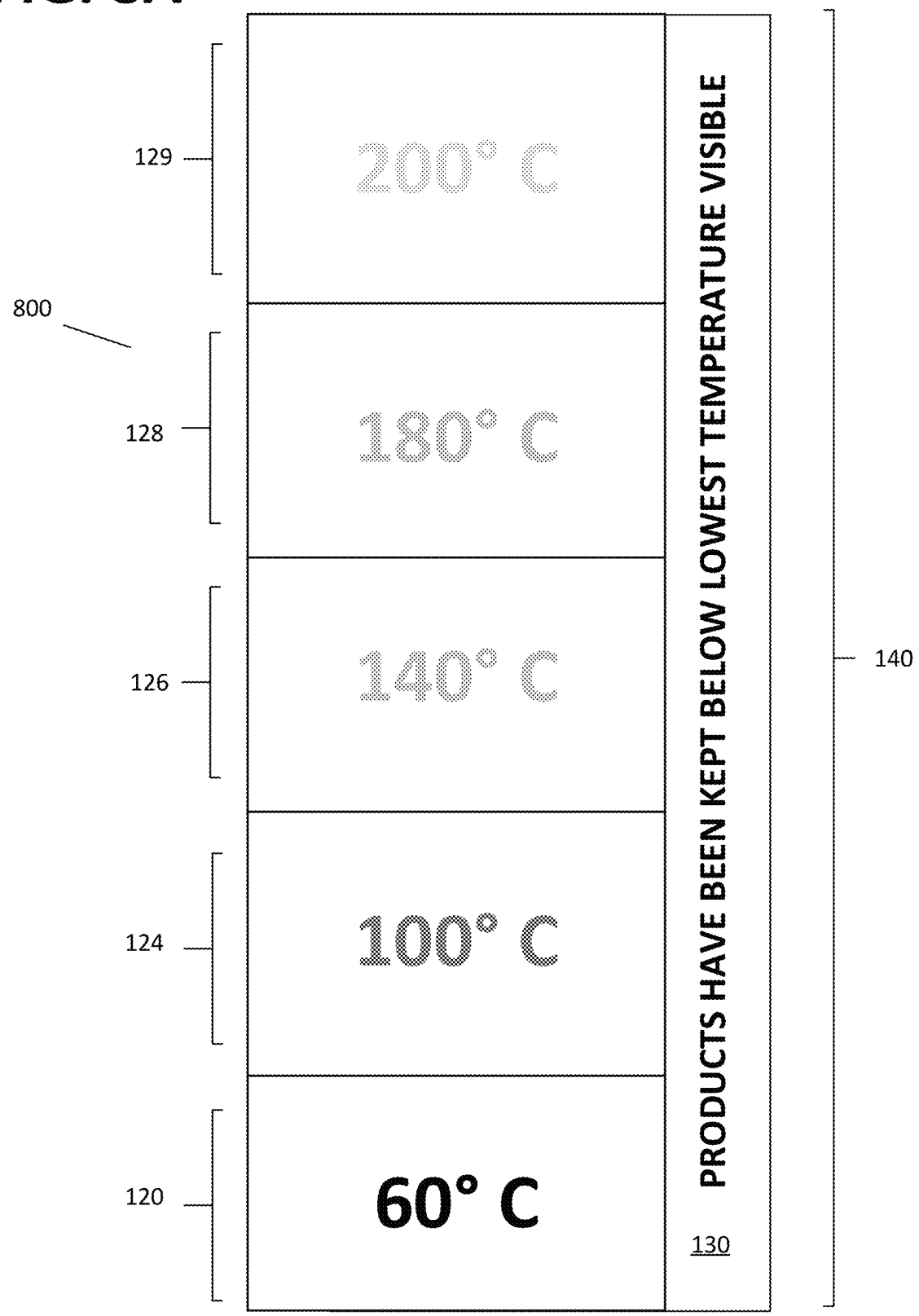
FIG. 8A illustrates a perspective view of a thermometer multi-temperature exposure indicator, after customization, according to an example of the present disclosure.

FIG. 8A illustrates a perspective view of a multi-temperature exposure thermometer indicator, after customization, according to an example of the present disclosure. Referring to FIG. 8A, the substrate of indicator 800 includes a plurality of indicator regions 120, 124, 126, 128 and 129 where at least five different environmental thermochromic compositions are provided in indicator regions 120, 124, 126, 128 and 129, respectfully. The at least five environmental thermochromic compositions are invisible to the human eye when provided on the plurality of indicator regions 120, 124, 126, 128 and 129, of the substrate 140. The at least five environmental thermochromic compositions provided on the plurality of indicator regions 120, 124, 126, 128 and 129 are provided immediately adjacent one another and in sequence of increasing predetermined temperature thresholds in order to achieve thermometer functionality. Each predetermined temperature threshold is dependent and directly related to the specific environmental thermochromic composition provided on the plurality of indicator regions 120, 124, 126, 128 and 129.

In an embodiment, a portion of the at least four environmental thermochromic compositions 122, 134, 136 and 138 in the plurality of indicator regions 120, 124, 126 and 128, respectfully, are treated with heat from thermal print head, similar to the thermal printer 170 of FIG. 7C, and the treated portions become visible. Conversely, other portions of the environmental thermochromic composition in the plurality of indicator regions 120, 124, 126, 128 and 129, remain untreated and invisible, as applied to the substrate 140 because it didn't receive heat treatment. The treated regions may be selected to provide a human readable indicia within the plurality of indicator regions 120, 124, 126, 128 and 129. In an embodiment the indicia may be formed by the visible material that indicates the predetermined threshold temperature of each of the different environmental thermochromic compositions in each of the indicator regions 120, 124, 126, 128 and 129.

In an embodiment, substrate 140 of indicator 800 includes a data region 130. The data region includes an additional, different, printing thermochromic composition and the printing thermochromic composition configured within the data region changes color states from a third color state to a fourth color state when heated above a predetermined temperature threshold. For example, data region 130 may provide information on how to utilize the information (i.e. visual indications) provide indicator regions 120, 124, 126, 128 and 129.

Figure 8B:
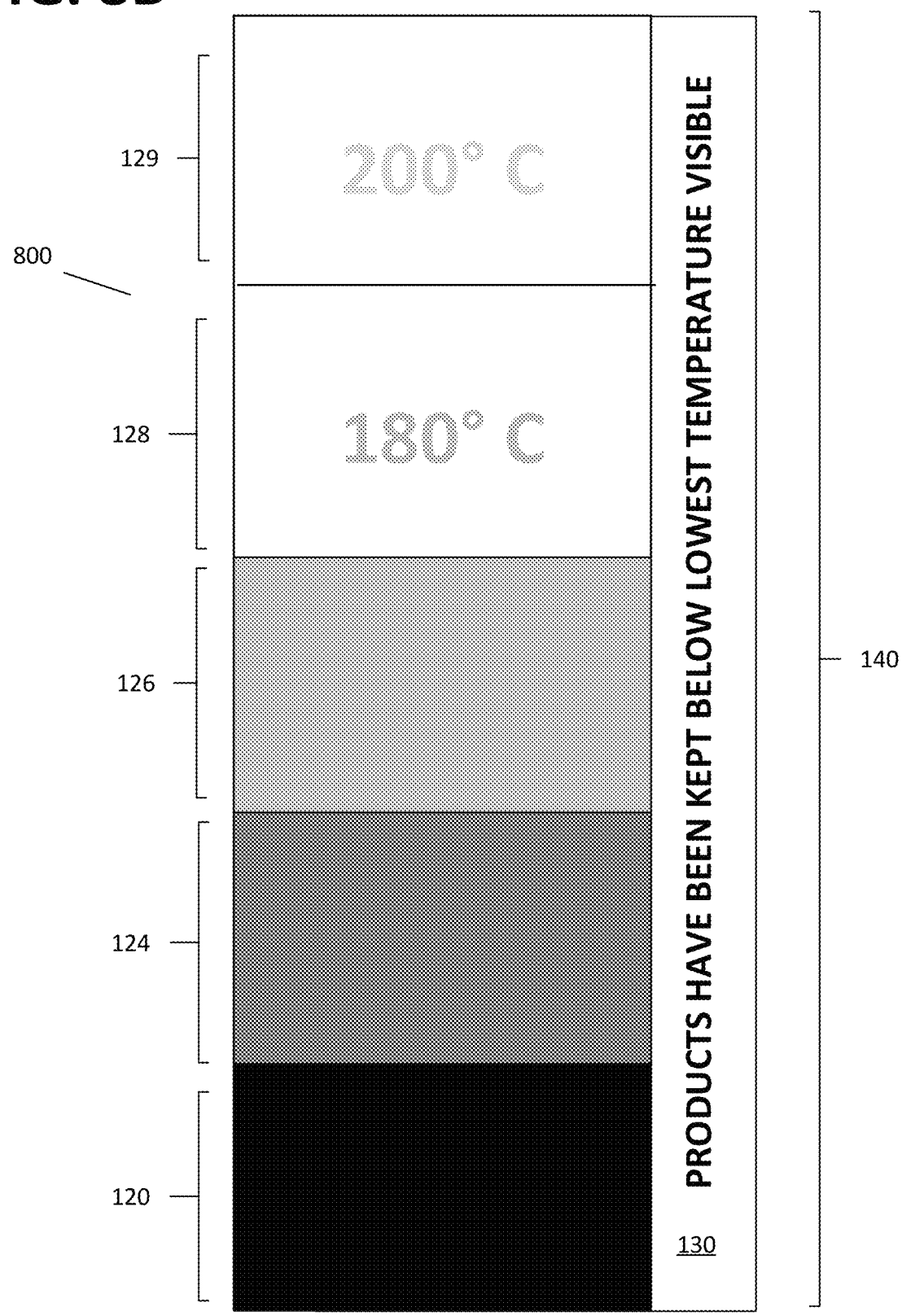
FIG. 8B illustrates a perspective view of the thermometer multi-temperature exposure indicator of FIG. 8A, after exposure to an ambient temperature above a plurality of predetermined thresholds, yet not above additional predetermined thresholds, according to an example of the present disclosure.

FIG. 8B illustrates a perspective view of the thermometer multi-temperature exposure indicator of FIG. 8A, after exposure to an ambient temperature above a plurality of predetermined thresholds, yet not above additional predetermined thresholds, according to an example of the present disclosure. Referring to FIG. 8B, upon the indicator 800 being exposed to a temperature equal to or greater than three of the five predetermined threshold temperatures, the environmental thermochromic composition in the second portion of the plurality of indicator regions 120, 124 and 126 that were not treated by the thermal printer 170 of FIG. 7C, transition to the second color state and become visible to the human eye. Therefore, because the remaining environmental thermochromic composition in the plurality of indicator regions 120, 124 and 126, transitions from a first color state to a second color state, the indicia of the respective predetermined temperature threshold located in plurality of indicator regions 120, 124 and 126, which are already in the second color state because of being heat treated by thermal printer 170, is no longer visible to the human eye. This provides indication that temperature excursion above three of the four predetermined threshold temperatures has occurred and further providing specific information that product utilizing indicator 800 has been kept below at least the lowest temperature visible.

Figure 8C:
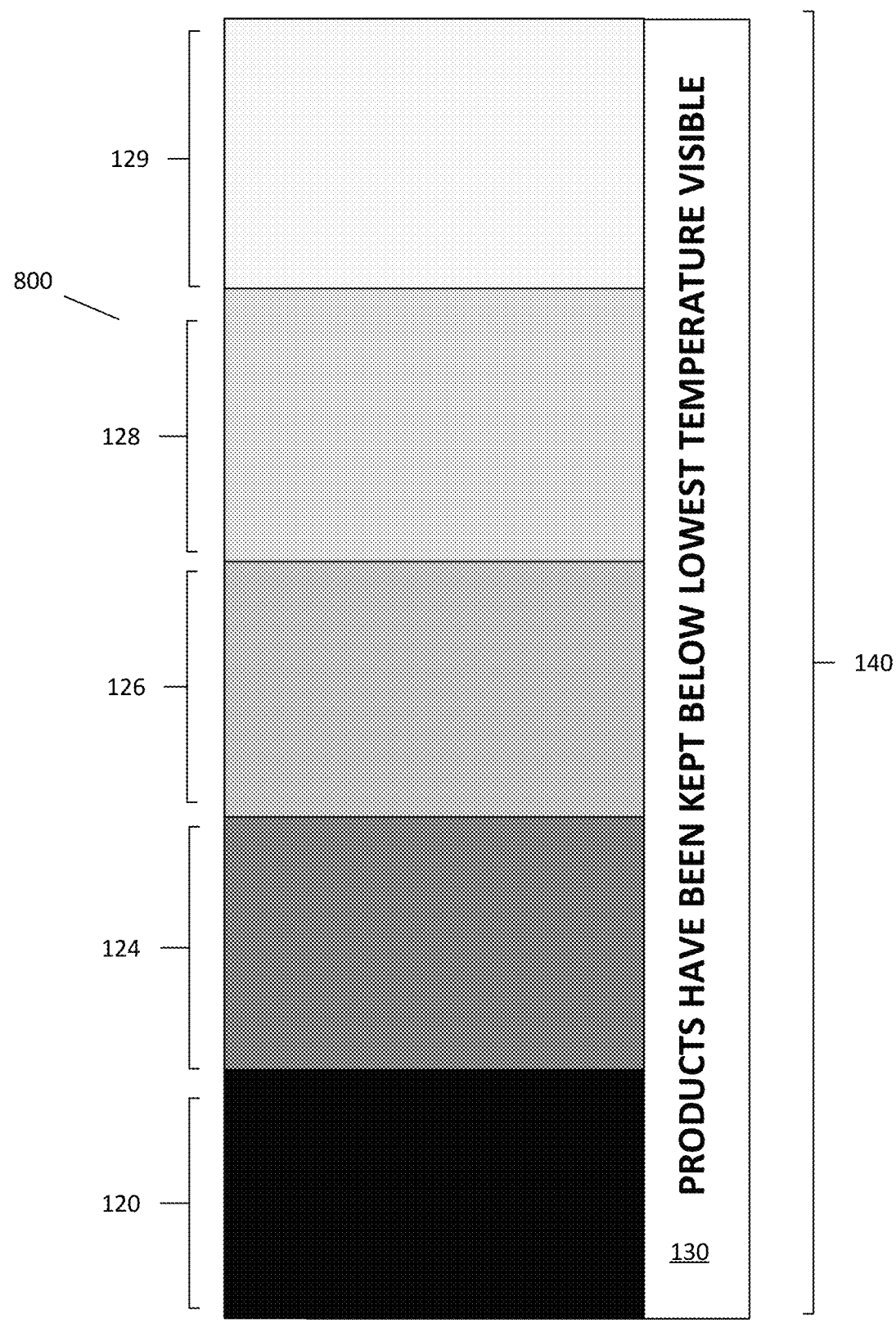
FIG. 8C illustrates a perspective view of the thermometer multi-temperature exposure indicator of FIG. 8A, after exposure to an ambient temperature above a plurality of predetermined thresholds, according to an example of the present disclosure.

FIG. 8C illustrates a perspective view of the thermometer multi-temperature exposure indicator of FIG. 8A, after exposure to an ambient temperature above a plurality of predetermined thresholds, according to an example of the present disclosure. Referring to FIG. 8C, upon the indicator 800 being exposed to a temperature equal to or greater than all five predetermined threshold temperatures of the specific five environmental thermochromic compositions selected, the environmental thermochromic compositions in the second portion of the plurality of indicator regions 120, 124, 126, 128 and 129 that were not treated by the thermal printer 170 of FIG. 7C, transition to the second color state and become visible to the human eye. Therefore, because the remaining environmental thermochromic compositions in the plurality of indicator regions 120, 124, 126, 128 and 129 transitions from a first color state to a second color state, the indicia of the respective predetermined threshold temperatures located in plurality of indicator regions 120, 124, 126, 128 and 129 which are already in the second color state because of being heat treated by thermal printer 170, are no longer visible to the human eye. This provides indication that temperature excursion equal to or above all five predetermined threshold temperatures has occurred.

Figure 9A:
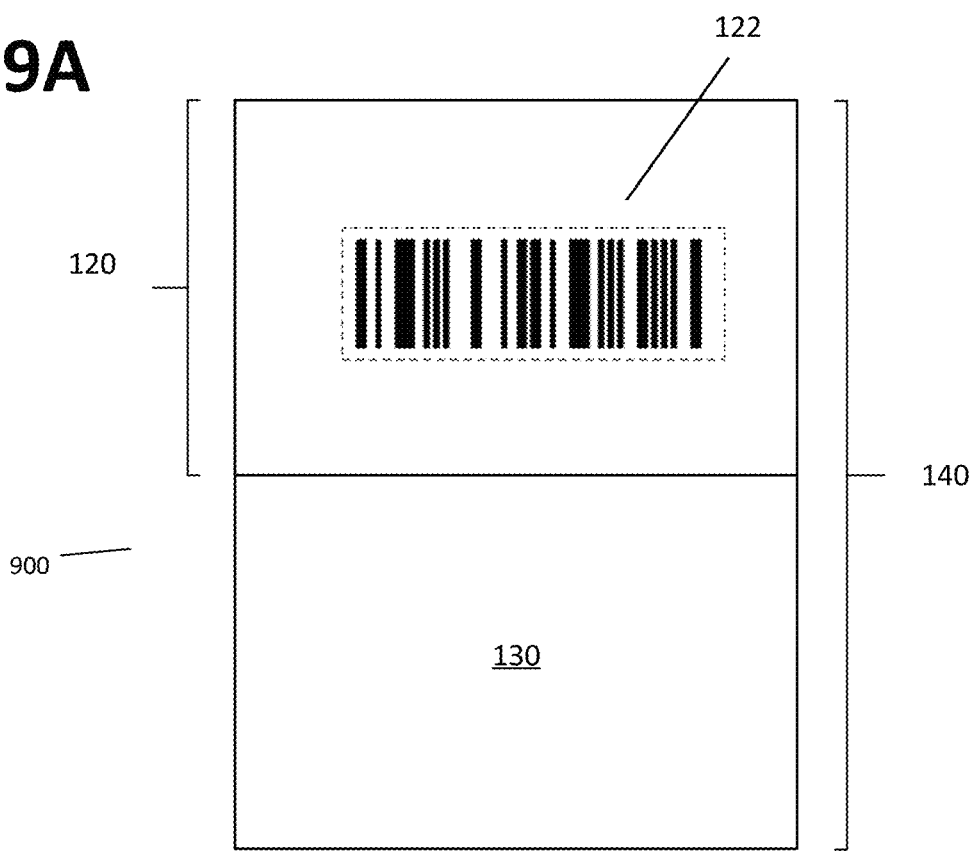
FIG. 9A illustrates a perspective view of an additional example of a temperature exposure indicator of FIG. 1A, after customization, utilizing a 2-D barcode, according to an example of the present disclosure.

FIG. 9A illustrates a perspective view of an additional example of a temperature exposure indicator 100 of FIGS. 1A and 1B, after customization, utilizing a 2-D barcode, according to an example of the present disclosure. In an embodiment, as illustrated in FIG. 10A, the indicator region 120 of indicator 900 overlays at least a portion of a bar code symbol 122 that is readable by an optical scanning device. The visual indication provided by the environmental thermochromic composition located in indicator region 120 affects the appearance of the bar code 122 and the changed appearance of the indicator region 120 may provide a different signal to the optical scanning device. Systems that combine color changing temperature exposure indicators, such as the one described in U.S. Pat. No. 10,318,781 to Prusik may be provided using this approach, thus allowing a bar code scanner or other device with similar capability to read and interpret the semi-irreversible temperature exposure indicator. Additionally, in an embodiment, the bar code symbol 122 is printed in the indicator region 120 and the indicator region 120 is placed in the high temperature state with the same printing operation.

Figure 9B:
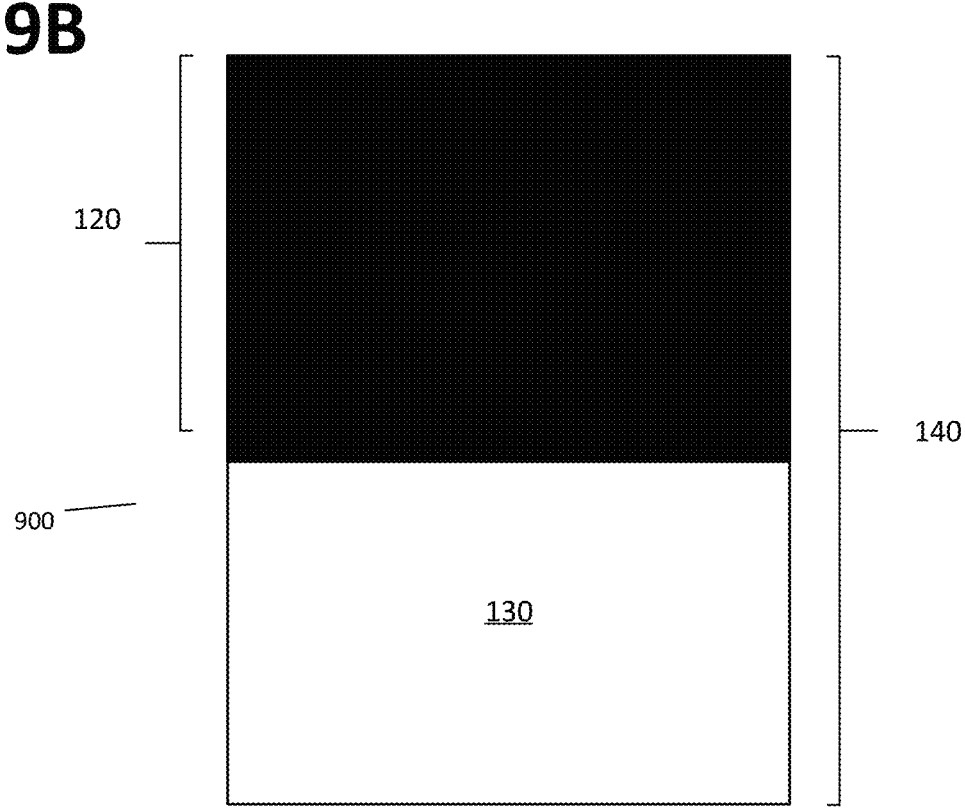
FIG. 9B illustrates a perspective view of the temperature exposure indicator of FIG. 9A, after exposure to an ambient temperature above a predetermined thresholds, according to an example of the present disclosure.

FIG. 9B illustrates a perspective view of the temperature exposure indicator of FIG. 9A, after exposure to an ambient temperature above a predetermined thresholds, according to an example of the present disclosure. Referring to FIG. 9B, upon the indicator 100 being exposed to a temperature equal to or greater than a predetermined temperature threshold, the environmental thermochromic composition in the second portion of the indicator region 120 that was not treated by the thermal printer 170 of FIG. 2A, transitions to the second color state and becomes visible to the human eye. Therefore, because the remaining environmental thermochromic composition in the indicator region 120 transitions from a first color state to a second color state, the 2-D barcode indicia 122 located in indicator region 120 which is already in the second color state because of being heat treated by thermal printer 170, is no longer visible to the human eye. Additionally, indicia 122 (2-D Barcode) is no longer readable by an optical scanning device. This provides indication that temperature excursion above a predetermined temperature threshold has occurred and a well-trained end user of the product becomes aware that the object utilizing the indicator 100 may have been damaged by the temperature excursion. Furthermore, the inability for the barcode to be scanned using an optical scanner indicates the product should not be used.

Figure 10:
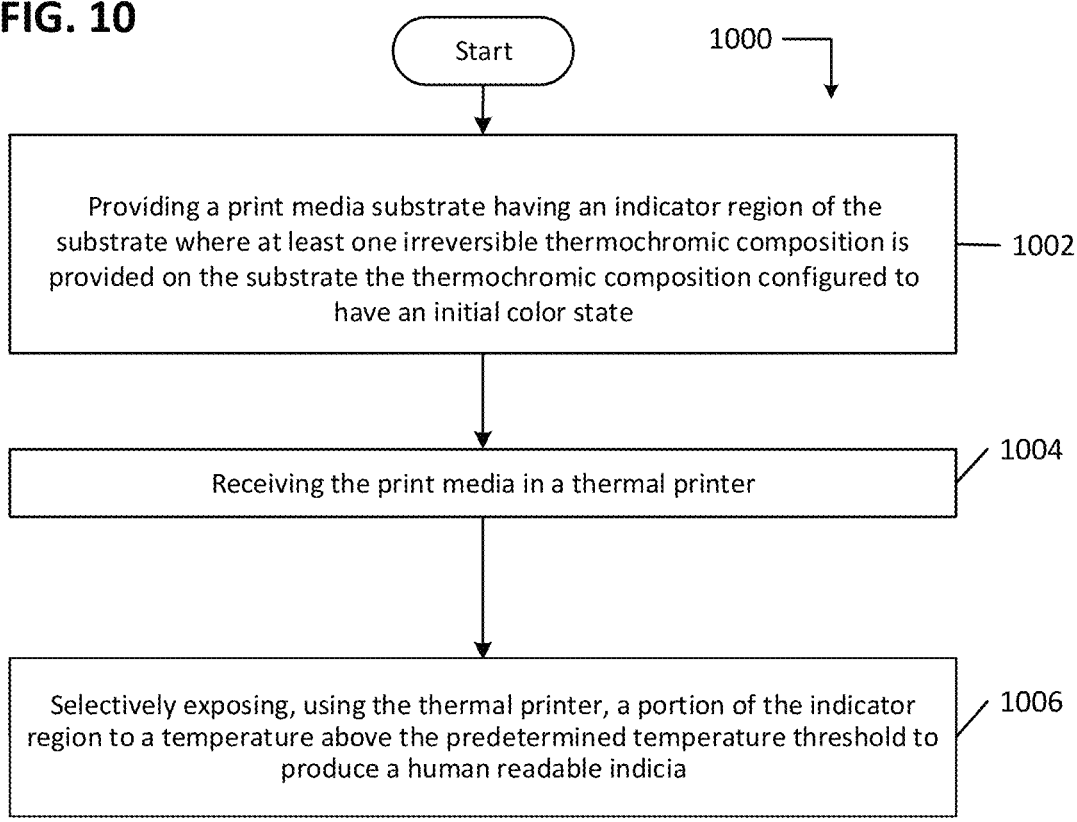
FIG. 10 is a block diagram illustrating a method for creating a temperature exposure indicator, according to an example of the present disclosure.

FIG. 10 is a block diagram illustrating an example method 1000 of creating an excess temperature exposure indicator according to an example of the present disclosure. In block 1002, providing a print media substrate having an indicator region of the substrate where at least one irreversible thermochromic composition is provided on the substrate. The thermochromic composition has an initial color and a second color state. Additionally, the thermochromic composition is in the initial color state prior to being exposed to a temperature below a predetermined temperature threshold and transitions to a final color state when exposed to a temperature above a predetermined temperature threshold. The thermochromic composition is provided on the substrate in the initial color state. In block 1004, receiving the print media in a thermal printer occurs. In an embodiment, in block 1006, selectively exposing, using the thermal printer, a portion of the indicator region to a temperature above the predetermined temperature threshold to produce a human readable indicia occurs, thereby customizing the indicator. In an embodiment, the indicator region changes appearance when the indicator region is subsequently exposed to an ambient temperature above the predetermined temperature threshold.

In an embodiment, the print media includes a thermal print media substrate. Additionally, method 1000 further includes exposing a portion of the thermal print media substrate using a thermal printer to a print temperature above a print temperature threshold which is greater than the predetermined threshold temperature. In an embodiment, the thermochromic composition is visible to the human eye in the initial color state and becomes invisible when exposed to the temperature above the predetermined temperature threshold.

In an embodiment, the color viewable to the human eye when the irreversible thermochromic composition is in the final color state is selected from a plurality of colors based upon the irreversible thermochromic composition. In an embodiment, the irreversible thermochromic composition within the first portion of the indicator region enters the final color state before the irreversible thermochromic composition within the indicator region enters the final color state.

In an embodiment, the predetermined temperature threshold is in a range from about 60° C. to about 200° C., from about 70° C. to about 190° C., from about 80° C. to about 180° C., from about 90° C. to about 170° C., from about 100° C. to about 160° C., from about 110° C. to about 150° C., from about 120° C. to about 140° C. In an embodiment, the at least one irreversible thermochromic composition transitions from an initial color state (invisible) to a final color state (visible) in response to exposure to an ambient temperature above a predetermined temperature threshold. Furthermore, the at least one irreversible thermochromic composition remains in the initial color state (invisible) when exposed to an ambient temperatures below a predetermined temperature threshold.

In an embodiment, the at least one irreversible thermochromic composition is one of (i) leuco dye (ii) liquid crystal; (iii) wax; (iv) micro-encapsulated dye; (v) an ester; (vi) an alkane; (vii) an organic polymer; (viii) an inorganic material. In an embodiment, the substrate is at least one of (i) paper; (ii) polyester; (iii) nylon; (iv) vinyl; (v) other synthetic polymers. In an embodiment, the substrate includes an adhesive backing.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention claimed is:

1. An excess heat exposure indicator, comprising:
a print media substrate comprising an indicator region and a data region; and
at least one first thermochromic composition provided on the substrate within the indicator region of the substrate, the first thermochromic composition configured to change color state from a first color state to a second color state when exposed to a temperature above a first predetermined temperature threshold;
wherein a second thermochromic composition provided on the substrate within the data region, the second thermochromic composition configured to change color state from a third color state to a fourth color state when heated above a second predetermined temperature threshold, wherein the second predetermined temperature threshold is higher than the first predetermined temperature threshold;
wherein the indicator region is selectively treated with heat above the first predetermined temperature threshold to place a first portion of the indicator region including the first thermochromic composition in the second color state, different than the first color state while leaving a remaining portion of the indicator region including the first thermochromic composition in the first color state, forming a visible indicia, the visible indicia configured to change appearance when the remaining portion of the indicator region is subsequently exposed to a temperature above the first predetermined temperature threshold.

2. The indicator of claim 1, wherein the indicator region is configured so that the indicia changes appearance when the remaining portion within the indicator region adjacent to the first portion changes to the second color state in response to a subsequent environmental exposure to temperature above the first predetermined temperature threshold.

3. The indicator of claim 1, wherein the first color state and the second color state are visibly contrasting and the third color state and the fourth color state are visibly contrasting.

4. The indicator of claim 1, wherein the indicia is configured to become unreadable or disappear when the remaining portion of the indicator region is exposed to a temperature above the first predetermined temperature threshold.

5. The indicator of claim 1, wherein the substrate is a direct thermal print media, configured to be printed by direct thermal printer at or above a print temperature, the print temperature being above the first predetermined temperature threshold.

6. The indicator of claim 5, wherein the indicator region is configured so that, when exposed to a temperatures between the first predetermined temperature threshold and the print temperature, the remaining portion of the indicator region is placed in the second color state thereby changing the appearance of the indicia.

7. The indicator of claim 5, further comprising a dataform printed on the data region of the substrate with the direct thermal printer.

8. The indicator of claim 1, wherein the data region and the indicator region are in separate regions on the substrate.

9. The indicator of claim 1, wherein the first color state of the first thermochromic composition is colorless or transparent.

10. The indicator of claim 1, wherein the second color state of the first thermochromic composition is a color viewable to the human eye.

11. The indicator of claim 1, wherein a plurality of indicator regions are provided on the print media substrate, each of the plurality of indicator regions transitioning from a respective initial color state to a respective final color state at a respective predetermined temperature threshold.

12. The indicator of claim 1, wherein the first predetermined temperature threshold is in a range from 0° C. to 60° C.

13. The indicator of claim 1, wherein the first thermochromic composition is configured to remain in the first color state prior to being exposed to a temperature above the first predetermined temperature threshold, and to remain in the second color state permanently after being exposed to the temperature above the first predetermined temperature threshold.

14. The indicator of claim 1, wherein the first thermochromic composition comprises a component selected from the group consisting of (i) a leuco dye, (ii) a liquid crystal, (iii) a wax, (iv) a micro-encapsulated dye, (v) an ester, (vi) an alkane, (vii) an organic polymer, (viii) an inorganic material, and (ix) a side chain crystalline polymer.

15. The indicator of claim 1, wherein the substrate further comprises at least one of (i) paper; (ii) polyester; (iii) nylon; (iv) vinyl; (v) other synthetic polymers.

16. The indicator of claim 1, wherein the indicator region includes an indicia that indicates the indicator has not been exposed to a temperature sufficient for sterilization, and wherein the first predetermined temperature threshold is at least 120° C., wherein the indicia is configured to be altered when the indicator region is exposed to temperature above the first predetermined temperature threshold.

17. The indicator of claim 1, wherein the first portion of the indicator region, upon transitioning from the first color state to the second color state, is configured to provide a partial pattern, wherein upon a second portion of the indicator region transitioning from the first color state to the second color state, the pattern provided by the first indicator region is completed, providing visual indication of exposure to a temperatures greater than a predetermined temperature threshold.

18. The indicator of claim 1, wherein the first portion of the indicator region, upon transitioning from the first color state to the second color state, is configured to provide a bar code or a portion of a bar code that is readable by an optical scanning device to produce a value, wherein upon the second portion of the indicator region transitioning from the third color state to the fourth color state, the appearance of the bar code is affected, and wherein the changed appearance of the bar code provides a different value when read with the optical scanning device.

19. The indicator of claim 1, wherein the indicator region does not occupy an entire face of the substrate.

20. A method of creating an excess temperature exposure indicator, the method comprising:
receiving a direct thermal print media substrate having an indicator region of the substrate where an irreversible thermochromic composition is provided over at least a portion of the substrate, the irreversible thermochromic composition configured to have an initial color state prior to being exposed to a temperature below a predetermined temperature threshold and a final color state when exposed to a temperature above the predetermined temperature threshold, wherein the substrate is provided with the thermochromic composition in the initial color state; and
selectively exposing a portion of the indicator region including the irreversible thermochromic composition to a temperature above the predetermined temperature threshold to produce a human readable indicia that is configured to change appearance when a remainder of the indicator region including the irreversible thermochromic composition is subsequently exposed to an ambient temperature above the predetermined temperature threshold.

21. The method of claim 20, further comprising:
exposing a portion of the thermal print media substrate using a thermal printer to a print temperature above a print temperature threshold which is greater than the predetermined temperature threshold.

22. The method of claim 20, wherein the irreversible thermochromic composition is visible to the human eye in the initial color state and becomes invisible when exposed to the temperature above the predetermined temperature threshold.

23. The method of claim 20, wherein the initial color state of the irreversible thermochromic composition is colorless or transparent.

24. The method of claim 20, wherein the final color state of the irreversible thermochromic composition is a color viewable to the human eye.

25. The method of claim 24, wherein the excess temperature exposure indicator includes a plurality of irreversible thermochromic compositions, each having respective distinct predetermined temperature thresholds, and each having distinct final color states distinguishable from each other by the human eye.

26. The method of claim 20, further comprising:
physically associating the excess temperature exposure indicator with a product to be monitored for exposure to excess temperature,
wherein the irreversible thermochromic composition within the portion of the indicator region enters the final color state before the excess temperature exposure indicator is associated with the product, and the irreversible thermochromic composition within a remainder of the indicator region enters the final color state after the excess temperature exposure indicator is associated with the product.

27. The method of claim 20, wherein the predetermined temperature threshold is in a range from 60° C. to 200° C.

28. The method of claim 27, wherein the predetermined threshold is in a range from 120° C. to 200° C.

29. The method of claim 20, wherein the irreversible thermochromic composition comprises at least one of (i) leuco dye (ii) liquid crystal; (iii) wax; (iv) micro-encapsulated dye; (v) an ester; (vi) an alkane; (vii) an organic polymer; (viii) an inorganic material.

30. The method of claim 20, wherein the substrate further comprises at least one of (i) paper; (ii) polyester; (iii) nylon; (iv) vinyl; (v) other synthetic polymers.

31. The method of claim 20, wherein the substrate includes an adhesive backing.

* * * * *